(12) United States Patent
Barton et al.

(10) Patent No.: US 9,215,072 B1
(45) Date of Patent: Dec. 15, 2015

(54) BACK-END MATCHING METHOD SUPPORTING FRONT-END KNOWLEDGE-BASED PROBABILISTIC AUTHENTICATION SYSTEMS FOR ENHANCED CREDENTIAL SECURITY

(71) Applicants: Edward M. Barton, Dublin, CA (US); Len L. Mizrah, Redwood City, CA (US)

(72) Inventors: Edward M. Barton, Dublin, CA (US); Len L. Mizrah, Redwood City, CA (US)

(73) Assignee: AUTHERNATIVE, INC., Redwood City, CA (US)

( * ) Notice: Subject to any disclaimer, the term of this patent is extended or adjusted under 35 U.S.C. 154(b) by 673 days.

(21) Appl. No.: 13/658,815

(22) Filed: Oct. 23, 2012

(51) Int. Cl.
*H04L 9/00* (2006.01)
*H04L 9/32* (2006.01)
*H04L 29/06* (2006.01)

(52) U.S. Cl.
CPC .......... *H04L 9/3226* (2013.01); *H04L 63/0853* (2013.01)

(58) Field of Classification Search
CPC .................................................. H04L 63/0853
USPC ............................................................ 726/5
See application file for complete search history.

(56) References Cited

U.S. PATENT DOCUMENTS

| | | | |
|---|---|---|---|
| 5,241,599 A | 8/1993 | Bellovin et al. |
| 5,276,314 A | 1/1994 | Martino et al. |
| 5,425,102 A | 6/1995 | Moy |
| 5,440,635 A | 8/1995 | Bellovin et al. |
| 5,465,084 A | 11/1995 | Cottrell |
| 5,559,961 A | 9/1996 | Blonder |
| 6,085,320 A | 7/2000 | Kaliski, Jr. |
| 6,189,098 B1 | 2/2001 | Kaliski, Jr. |
| 6,209,104 B1 | 3/2001 | Jalili |
| 6,226,383 B1 | 5/2001 | Jablon |
| 6,332,192 B1 | 12/2001 | Boroditsky et al. |
| 6,792,533 B2 | 9/2004 | Jablon |
| 6,829,356 B1 | 12/2004 | Ford |
| 6,934,860 B1 | 8/2005 | Goldstein |
| 6,959,394 B1 | 10/2005 | Brickell et al. |
| 7,010,692 B2 | 3/2006 | Jablon |
| 7,073,067 B2 | 7/2006 | Mizrah |
| 7,139,917 B2 | 11/2006 | Jablon |
| 7,188,314 B2 | 3/2007 | Mizrah |
| 7,359,507 B2 | 4/2008 | Kaliski |
| 7,506,161 B2 | 3/2009 | Mizrah |
| 7,577,987 B2 | 8/2009 | Mizrah |

(Continued)

OTHER PUBLICATIONS

Tao, H., "Pass-Go, a New Graphical Password Scherne,"© thesis for the Master of Applied Science degree in Electrical and Computer Engineering, University of Ottawa, Jun. 2006, 110 pages.

(Continued)

*Primary Examiner* — Longbit Chai
(74) *Attorney, Agent, or Firm* — Haynes Beffel & Wolfeld LLP

(57) ABSTRACT

A party can authenticate itself by interacting with multiple servers without revealing the shared secret to any of the involved parties. The stored shared secret is strengthened and broken into shares and saved on the servers. The shared secret is safe against offline brute force attack unless all servers where the shares are stored are compromised. The compromise of any single server, or multiple servers—but less than the maximum number—will not allow the attacker to do a brute force analysis on the shared secret. This back end security enhancement is suitable for probabilistic front end authentication algorithms.

49 Claims, 11 Drawing Sheets

(56) References Cited

U.S. PATENT DOCUMENTS

| | | | |
|---|---|---|---|
| 7,644,433 | B2 | 1/2010 | Mizrah |
| 7,681,228 | B2 | 3/2010 | Mizrah |
| 7,716,484 | B1 | 5/2010 | Kaliski, Jr. |
| 7,725,730 | B2 | 5/2010 | Juels et al. |
| 7,849,321 | B2 | 12/2010 | Mizrah |
| 8,006,300 | B2 | 8/2011 | Mizrah |
| 2004/0119746 | A1 | 6/2004 | Mizrah |
| 2004/0123160 | A1 | 6/2004 | Mizrah |
| 2004/0225899 | A1 | 11/2004 | Mizrah |
| 2008/0148352 | A1* | 6/2008 | Matsumoto et al. .............. 726/2 |
| 2012/0166791 | A1 | 6/2012 | Barton et al. |
| 2012/0166809 | A1 | 6/2012 | Barton et al. |
| 2013/0139224 | A1* | 5/2013 | Wehmeier et al. ................ 726/4 |

OTHER PUBLICATIONS

Bolande, H.A., "Forget passwords, what about pictures?" ZDNet, Nov. 27, 2000, 2pp.

R Dhamija et al., "Deja vu: A User Study Using Images for Authentication," Proc. of the 9th USENIX Security Symp.,© Aug. 2000, 15 pp.

Haubert III, W.H. "An Interactive Approach to Secure and Memorable Passwords," A Thesis in TCC 402, School of Engineering and Applied Science, Univ. of VA, Mar. 25, 2002, 26 pp.

Jermyn, I. et al., "The Design and Analysis of Graphical Passwords," Proc. 8th USENIX Security Symp., Aug. 1999, 15pp.

Lee, J., "And the Password is...Waterloo," New York Times, Dec. 27, 2001, 4pp.

Lemos, R., "Passwords: The weakest Link?" CNET News.com, May 22, 2002, 4pp (http://news/com.com/2009-1001-916719.html).

K.S. McCurley, "Protecting Privacy and Information Integrity of Computerized Medical Information," Sandia National Laboratories, Mar. 11, 1996, 27 pp. (http://www.swcp.com/1mccurley/cs.sandia.gov/health/health.html).

A. Perrig et al., "Hash Visualization: A New Technique to improve Real-world Security," Computer Science Dept., Carnegie Mellon Univ., 8 pp. (http://paris.cs.berkeley.edu/%7Eperrig/projects/validation/validatio- n/pdf).

Reynolds, M. "Microsoft TechFest Signposts Software Futures," Gartner Dataquest Perspective, Gartner, Inc., 2002, 8 pp.

Perrig A., et al., "Deja vu: Using Images for User Authentication," Oct. 2000, 2 pp. (http://www.sims.berkeley.edu/dejavu).

"The Science Behind Passfaces," © Real User Corporation, Jun. 2004, 5 pp. (http://www.realuser.com/published/ScienceBehindPassfaces.pdf).

Extended European Search Report Mailed May 26, 2010 in Application No. 07114710.2, 7 pp.

Wikipedia, "Hardware security module," Oct. 2012, 4 pp. (http://en.wikipedia.org/wiki/Hardware_security_module).

* cited by examiner

| | | | | | | | | | |
|---|---|---|---|---|---|---|---|---|---|
| 10 | 5 | 3 | 6 | 1 | 5 | 10 | 6 | 9 | 6 |
| 2 | 1 | 10 | 8 | 5 | 7 | 4 | 7 | 1 | 10 |
| 5 | 3 | *5* | 4 | 1 | 9 | 3 | 2 | 4 | 3 |
| 7 | 10 | *7* | 10 | 6 | 7 | 4 | 6 | 5 | 6 |
| 2 | 4 | *1* | 9 | 4 | 10 | 8 | 9 | 4 | 7 |
| 8 | 7 | *3* | 7 | 8 | 2 | 5 | 2 | 6 | 3 |
| 5 | 6 | *10* | 2 | 10 | 3 | 1 | 7 | 9 | 1 |
| 10 | 3 | *9* | 8 | 4 | 6 | 9 | 2 | 8 | 3 |
| 8 | 7 | *1* | *6* | *9* | *8* | 5 | 1 | 5 | 9 |
| 4 | 9 | 2 | 8 | 1 | 2 | 3 | 8 | 4 | 2 |

Fig. 2

BACK-END MATCHING METHOD SUPPORTING FRONT-END KNOWLEDGE-BASED PROBABILISTIC AUTHENTICATION SYSTEMS FOR ENHANCED CREDENTIAL SECURITY

RELATED APPLICATIONS

The present application is related to U.S. patent application Ser. No. 13/658,800 entitled AUTHENTICATION METHOD OF FIELD CONTENTS BASED CHALLENGE AND ENUMERATED PATTERN OF FIELD POSITIONS BASED RESPONSE IN RANDOM PARTIAL DIGITIZED PATH RECOGNITION SYSTEM, now U.S. Pat. No. 8,868,919, issued 21 Oct. 2014, and U.S. patent application Ser. No. 13/658,812 entitled AUTHENTICATION METHOD OF ENUMERATED PATTERN OF FIELD POSITIONS BASED CHALLENGE AND ENUMERATED PATTERN OF FIELD POSITIONS BASED RESPONSE THROUGH INTERACTION BETWEEN TWO CREDENTIALS IN RANDOM PARTIAL DIGITIZED PATH RECOGNITION SYSTEM, now U.S. Pat. No. 8,955,074, issued 10 Feb. 2015, both of which were filed on the same day as the present application, and have the same inventors, and both of which are incorporated by reference as if fully set forth herein.

FIELD OF THE INVENTION

The invention relates generally to computer security, and systems that store and authenticate user based credentials using multiple servers. One aspect of the invention relates to splitting the strong shared secret into shares and splitting the shares amongst many servers. The shares must be split in such a way that the compromise of one server does not easily compromise the security of the strong secret.

DESCRIPTION OF RELATED ART

Static Credentials and Deterministic Authentication

The problem with passwords: passwords are static user credentials. This is a fundamental weakness in the secret. Even if a password is long with alpha-numeric and special characters and thereby considered strong, it can still be stolen by an attacker by many different means including sniffing, key logging, phishing, shoulder surfing, man-in-the-middle, and many different types of malware. An additional consideration with passwords is that if a network vulnerability was discovered, than all the passwords that flowed through the network during the window of exposure would have to be considered compromised.

The traditional password or pin is just one example of a deterministic form of authentication. By deterministic authentication we mean that there is one, and only one, static credential that will correctly authenticate the user. In other words, either the static credential is entered correctly during a login session or it is not. This fact of the very nature of deterministic authentication is what opens the attack vectors listed in the preceding paragraph. And, as such, while passwords and other forms of deterministic credentials can be improved upon, they cannot be truly fixed without a shift in paradigm from deterministic authentication to something else.

The Essence of Probabilistic Authentication

The Random Partial Pattern Recognition (RPPR), the Random Partial Digitized Path Recognition (RPDPR), and the Random Partial Digitized Path Recognition with Secret Challenge (RPDPR-SC) algorithms, all invented by Mizrah in U.S. Pat. Nos. 7,188,314 and 7,644,433, 7,073,067, and 7,849,321 respectively—are examples that describe just such a paradigm shift. These algorithms were created to solve some of the many deficiencies of static passwords including: memorization difficulties, low security, and a number of front end attack vectors like phishing, man-in-the-browser, malware, and Trojans. To reduce memorization pressure, significantly improve ease of use, and solve many front end security flaws with static credentials like password, the RPDPR, RPDPR-SC, and RPPR technologies utilize a dynamic grid of fields and a graphical pattern of fields that is the shared secret. These examples are a form of authentication that fixes the front end problems and vectors of attack that deterministic authentication is vulnerable to. This form of authentication, in essence the paradigm shift to a more secure front end put into practice, is another type of authentication that can be characterized as probabilistic authentication.

When the term 'probabilistic' is invoked in the realm of security and authentication it usually refers to what-user-is authentication, or biometrics. Since there are mechanical limitations in biometrics, say a reader cannot completely capture store and check all of the swirl patterns on a thumb, there are software algorithms that must decide if a certain percentage of matches are enough for a given user to be authenticated. In this invention, the term 'probabilistic' can be applied to knowledge based, or what-user-knows, authentication, which changes the concept and how it is applied. Thus it would be helpful to fully describe the scope of what is meant by 'probabilistic authentication' as it is applied to knowledge-based user authentication.

First, let there be a brief discussion about credential setup/creation. Notice that all forms of differentiation between deterministic and probabilistic authentication will always refer to authentication or the act of authenticating a user. In other words, there are only differences between the two methods during a login operation. This is because, by definition, what user knows is a static value that must be present on both the user side and the authenticating authority (the server side) that the user is talking to during post setup login session. An easy example of a setup operation is a browser front end where the user enters the credential and a server connected to a database on the back end where the credential is stored. In other words, the user and the server must both know something so that in future operations the user can prove that they are who they say they are. It's clear to see that deterministic authentication is an easy step from a static credential created during a setup operation; the value entered in the front end is sent to the back end and compared. There has been much art to improve this deterministic way of authenticating, but, ultimately, the credential must be entered the one and only one-way on the front end that is correct. The paradigm shift is defining a front end login system that solves inherent problems of deterministic authentication.

Examples of Probabilistic Knowledge Based User Authentication

So the term 'probabilistic authentication' can be logically applied to a what-user-knows authentication event which in most of the cases is a login operation (though, it can be, for instance, a transaction authorization based on a user authentication event). A probabilistic authentication front end is something that inserts a mapping layer between what the user knows and what the user enters as a response. This layer of obfuscation can generate a one-to-many mapping such that for any response that the user enters in the front end, there are multiple credential parameters, such as characters/positions/shapes/colors/etc that can be the real or actual credential characters/positions/shapes/colors/etc.

To examine an example of probabilistic authentication, the embodiments of U.S. Pat. Nos. 7,073,067 and 7,849,321 will be used. These arts are based on a visual pattern and visual pattern recognition. This type of credential is easier to remember than strong traditional passwords, while still being very secure. Since an enumerated pattern is a visual pattern, it is best introduced with a picture (See FIG. 1). The credential is a static enumerated pattern as all what-user-knows authentication factors must be. In this example, it is in the shape of an 'L' that starts at the top and goes down and then right. A grid with empty fields, like the one in FIG. 1, would be used for the credential setup. The login grid would contain redundant random digital content that is necessary for the one-to-many mapping that probabilistic authentication requires. This digital content can be anything from letters to numbers to symbols. See FIG. 2 for an example of using numbers as the digital content.

Further using FIG. 2 as the embodiment of an example of a probabilistic login operation: To authenticate a user, the server sends the user a 10×10 grid of fields filled with random content, which is different every session. (The term "random" as used herein includes truly random and pseudorandom.) In addition, the user is challenged with certain field positions along the pattern—say, the $2^{nd}$, $4^{th}$, $5^{th}$, and $9^{th}$ positions. These positions could simply be called the challenge. The challenges improve the security of the front end by reducing its entropy leakage, but are not necessary for a probabilistic front end.

Since the response is only the digital content in the credential enumerated challenge positions, the user could enter the response by typing them, clicking on the appropriate field, or even clicking on a totally different field that has the same digit in it. Referencing FIG. 2 where the enumerated pattern is highlighted for easy reference (FIG. 1 has the explicitly enumerated pattern field positions):

The digital content in enumerated field position 2 is 7.
The digital content in enumerated field position 4 is 3.
The digital content in enumerated field position 5 is 10.
The digital content in enumerated field position 9 is 9.

Note that the response to the first challenge of enumerated position 2 is digital content of 7. There are 10 different positions on the grid that contain 7's. As an attacker looks at the response of 7, there is not a one-to-one mapping that compromises that position in one session. Even if the digital content is monitored on the front end by malicious attackers or software, the true credential position on the grid is not directly leaked because the response is merely the digital content of the field which is repeated on the grid. This significantly minimizes the credentials' entropy leakage and enhances the credentials' combinatorial capacity, which renders one-time authentication responses difficult to compromise. The attacker merely knows (upon a valid authentication signal) that one of the ten positions is the correct one, but not exactly which one is correct.

Since the digital content in the grid is different every session, the authentication code would be different even if the next challenge was 2, 4, 5, and 9 again. For example, the next authentication challenge could be 10, 2, 3, 8, and 5. This allows for different levels of security, randomness, and usability that can easily be changed to suit the needs of a particular user base. The digital content, in this case 8, 7, 1, 6, and 10 is sent to the server to be checked.

To find out if the digital response is correct, the server must map the digital content to the positions that those fields with the same digital content occupy in the grid. In the example, there are 10 of each number. So each digital response will be mapped to 10 different positions. These 10 positions are salted and hashed. The correct salted and hashed position from the user store is compared against the 10 positions from the grid. If one of the 10 positions is the same, then that challenge's response is considered correct. This is a probabilistic method of authentication. For a single challenge position, a user could be authenticated merely by guessing the correct digital content, without knowing the correct enumerated credential position. This is a big difference from deterministic authentication of a static credential, like password.

Credential Security Enhancements with Probabilistic Authentication on the Front End So, probabilistic is an authentication model where there is a one-to-many mapping from the response to the credential. This means that if an attacker guesses a correct response, it does not mean that the credential is compromised. For this and many other reasons probabilistic authentication is a desirable security feature on the front end and a prime candidate to replace deterministic credential authentication.

The probabilistic front end can, of course, be combined with any number of other authentication factors. The examples using FIGS. 1 and 2 are an embodiment of a standalone, in-band challenge and response probabilistic authentication and can be combined with any other authentication factors. For example, it can be combined with hardware token based one-time-pin, traditional passwords, soft tokens on smart phones, or biometrics. So, just like password and other forms of deterministic authentication, a probabilistic authentication operation can be chosen as the knowledge based solution of choice and combined with another other what-you-have, out-of-band factor of choice.

Probabilistic authentication can also be used with out-of-band techniques as described in Mizrah's U.S. Pat. No. 8,006,300. There are multiple ways to do this. For example, the random challenge could be send out of band. The grid with randomized digital content could be sent out of band. Both of them could be sent out of band to the same, or different, devices. This solves one of the biggest problems with hard- and soft-what-you-have tokens in that if they are stolen the factor is compromised.

Even if the hard- or soft-token is password or pin protected, this is, at best, a minor protection since the problems with passwords/pins are well-known and fairly easy to circumvent. So that traditional tokens really do become what-user-has factors of authentication which, by definition, are compromised, if the user no longer has the token. An example of a simple way that a challenge and response use a what-you-have authentication factor is to send the authentication challenge out-of-band via SMS/MMS to a mobile device. This means that even if the device is stolen (or the SMS/MMS channel is pre-empted), the malicious attacker merely has access to the challenge and the grid with the session specific random content. This is not enough to authenticate since the credential is still unknown to the attacker.

Credential Security Drawbacks with Probabilistic Authentication at the Back End

For all the innovative front end improvements, there is a fundamental, non-apparent drawback for using a probabilistic front end authentication. The shared secret is a static, knowledge based credential; as such it must be able to be stored in some form on the server side and compared in some way with a user entered value that can produce a response that is/is not authenticated. The very nature of probabilistic authentication on the front end can impact how these types of credentials are stored on the back end.

It is easiest to see using from the example shown in FIG. 1 and FIG. 2 where the credential is an enumerated pattern of fields on a grid and the challenge to the users can be any one of those positions—which, on the front end, is a substantial security benefit—that those positions must be stored on the back end separately, so they can be checked separately.

Not quite as obvious, but in exactly the same manner, a probabilistic front end that is not using a partial challenge-response system still must store the characters or positions of the credential separately. Why is this? Static credentials checked deterministically must be completely correct or are not authenticated. It does not matter if one character is incorrect or all of them are; the response must be exact for the user to be authenticated. This means that the each character can be concatenated together and treated as a whole. Static credentials checked probabilistically cannot be concatenated together. This is because a response is not exact, it is one of many. So, for any given position or character of a credential, it must be checked against a set of responses. If the credential was concatenated together, the repercussions are severe. First, a permutation of the responses would have to be generated at login time and would be quite processing intensive, since all the possible combinations of positions would have to be calculated and checked. This alone is enough reason to not concatenate the values, since the user will only tolerate minimal disruption in the form of lag or pauses for authentication. It also puts the burden of a lot of unneeded processing on the server side, which is neither desirable nor acceptable. Additionally, in a bad response it would not be known, which character or position that was incorrect. This can limit other systems that analyze the quality of the response—which is only possible using a probabilistic authentication—via a form of risk engine: if one position out of eight was incorrect it seems like a valid mistake; however, if all of them are repeatedly wrong it could signal an intruder.

Given that the preferred embodiment for the storage of a static credential that is used for probabilistic authentication is to store the positions/characters/values—which can be called credential elements—separately, there are ramifications for the security of said embodiment. Let's take an example of a well-known password type credential and compare storing it for deterministic authentication and storing it for probabilistic authentication to illustrate the differences.

Let's assume that the credential is alpha numeric (upper case letters, lower case letters, and the digits from zero to nine) and 8 character positions long. As an example, we can use the static credential 'passw0rd.' We will also assume an industry standard approach to storing a secret. By this we mean that a salt will be added and the resultant value would be hashed, and that is what will be stored. To store this secret for use in deterministic authentication, the letters are concatenated together. Thus, the randomness for the secret is a permutation of the characters and would be, in this case, $62^8$ (8 positions each of which could be one of 26 lower case letters, 26 uppercase letters, or 10 digits) or $2.1 \times 10^{14}$. On the other hand, when the characters of the secret are not concatenated together and are stored separately to be used for probabilistic authentication, the brute force space of the single character is much less. The calculation is trivial—if each one is taken separately, then each one can be one of 62 things (the 26 lower case letter, 26 upper case letters and the 10 digits). This level of randomness is unacceptably low and could be easily broken in a real time attack. However, the security improvements on the front end using a probabilistic login are so extensive and solve so many of the attack vector problems, that deterministic authentication is vulnerable to, that it is highly desirable to use probabilistic authentication. The problem is then clear; how can a static credential be stored, separated to be used in probabilistic authentication, and still made secure on the back end.

A Note on Front End Terminology

The term credential is sufficient for describing a shared secret that a user knows. However, since there are many types of static credentials that can be used for probabilistic authentication, there is a need to define a common term used to describe each piece of the credential since each one must be stored separately for the credential. For example, the term for each piece of an enumerated pattern, like the one in FIG. 1, is position. As another example, the term used for each piece of a password is typically alpha-numeric character, or more simply just a character. Since the term character does not apply to an enumerated pattern and the term position can only loosely be applies to a password, both of them can be considered confusing as a term in common for both. Element is a much better term to use since both passwords and enumerated patterns are credentials comprised of elements. The password 'pwd' for example has 3 elements. The enumerated pattern in FIG. 1 has 10 elements. So, the term element in context of this invention will be understood to mean any piece of a credential to be used for probabilistic authentication, whether, as in the examples, it is a position of an enumerated pattern or an alpha-numeric character of a shared secret like password.

As was said previously, probabilistic authentication on the front end can be based on a one-to-many mapping. Additionally, this mapping can be shown to the user in some way. This visual construct can illustrate a transformation layer for the authentication procedure. The transformation layer can be displayed to the user in such a way that it contains both the credential elements as well as the session data that the elements of the credential are mapped to. The grid in FIG. 2 is an example of such a construct: it contains the enumerated pattern credentials as well as the session random digital content. Another example of a construct could be a virtual keyboard with letters in it (signifying the elements of a password) with shapes—for example, squares, triangles, circles, etc.—around the character (signifying the session data the elements are mapped to).

Solutions to Enhance Credential Security at the Back End for Deterministic Authentication Industry standard solutions can be applied to the separated credential used for probabilistic authentication to make it more secure in the back end server storage. First and foremost, all credentials can be salted and hashed. Furthermore, the data can be encrypted in the server side storage. For example, this could include simple database encryption or a more complex setup with a remote HSM module with key storage and key rotation. There are other "encryption at rest" schemes, however these solutions have the inherent problem that, at some point, the value is decrypted and checked. So while these types of technologies have a large impact on the security of a credential in storage, if the server doing the credential checking is compromised by an attacker, then they can get to the unencrypted (but salted and hashed) passwords and mount an attack on it.

There are more advanced techniques that can be applied to a credential as well. Primarily, these include secret strengthening, or adding high randomness to a low randomness credential, and secret splitting, or separating the secret into shares that are stored separately. These more advanced techniques can be applied to the separated credential as well. However, since a separated credential to be used for probabilistic authentication is fundamentally different than a static credential, the prior approaches were designed to work with static credentials like password and the art cannot be applied to this new type of credential.

Many of the split server technologies, as an example see Jablon's U.S. Pat. No. 7,139,917, require a client that can store the state of the algorithm, including data and parts of keys, which are needed for the next step in the protocol. This does not apply to the current invention in that the algorithms defined in this invention can be stateless. Stateless clients have inherent benefits and weaknesses to clients that preserve state. Strengths include ability to be applied to a wider range of environments and have less client side processing, thus needing less client processing power. Weaknesses include not being able to perform a full protocol exchange, like a key exchange or mutually authenticated key exchange, for additional security.

EMC U.S. Pat. No. 7,725,730 (developed by the RSA division of EMC uses a stateless architecture. However, U.S. Pat. No. 7,725,730 is not applicable to probabilistic authentication; it was made for static shared secrets, like password, that are authenticated deterministically. Deterministic authentication means that there is one and only one static credential that is the correct response. The RSA algorithm also has some light client side processing during the login process. However, even though the processing is not intensive, it is a critical component in their model. The client takes the static credential and combines it with a random value. The combined value is sent to one server, and the random value is sent to the second server. Neither server should know both of the values generated on the client or else they can determine the secret.

The probabilistic algorithm is fundamentally different. The random, session only digital response value entered by the user is sent to the server who maps it to the correct positions. This means that a user that guesses the correct digital response, even if it is the wrong field position, will get a valid authentication response. So the probability of someone guessing a correct response is a statistical calculation. For example, given a 10×10 grid that has 10 of each number from 1 to 10 and 2 challenge positions, we can see that there are 100 possible response permutations (10^2). So for this example a user guessing randomly could be authenticated in one in a hundred attempts.

This level of randomness is too low for anyone serious about security. To correct this situation, it is clear that there needs to be more than two challenge positions. Six challenged positions would be much better randomness with a one in a million chance (10^6). Four challenge positions would be like a four digit pin and one in ten thousand randomness (10^4). Other mechanisms and industry standard precautions can be combined to make a given level of guessing entropy acceptable. This could include things like making the user enter a password before performing the probabilistic authentication as well as locking the user out of an account after a certain number of incorrect attempts.

So, the deterministic algorithm with client side processing of a static credential presented in U.S. Pat. No. 7,725,730 cannot be applied to the type of probabilistic authentication defined by this art. One key difference that can be seen is that the prior art requires client side processing during login, so that the information is split between the two back end servers. The probabilistic authentication can be different in that the client side software need not know the correct position of the response; it merely passes along the user's digital content response.

The prior art references are listed below:

| REFERENCES | | |
|---|---|---|
| 5,241,599 | Bellovin, et al. | August 1993 |
| 5,276,314 | Martino et al. | January 1994 |
| 5,425,102 | Moy | June 1995 |
| 5,440,635 | Bellovin, et al. | August 1995 |

-continued

| REFERENCES | | |
|---|---|---|
| 5,465,084 | Cottrell | November 1995 |
| 5,559,961 | Blonder | September 1996 |
| 6,085,320 | Kaliski, Jr. | July 2000 |
| 6,189,098 | Kaliski, Jr. | February 2001 |
| 6,209,104 | Jalili | March 2001 |
| 6,226,383 | Jablon | May 2001 |
| 6,332,192 | Boroditsky et al. | December 2001 |
| 6,792,533 | Jablon | September 2004 |
| 6,829,356 | Ford | December 2004 |
| 6,934,860 | Goldstein | August 2005 |
| 6,959,394 | Brickell et al. | October 2005 |
| 7,010,692 | Jablon | March 2006 |
| 7,073,067 | Mizrah | July 2006 |
| 7,139,917 | Jablon | November 2006 |
| 7,188,314 | Mizrah | March 2007 |
| 7,359,507 | Kaliski | April 2008 |
| 7,506,161 | Mizrah | March 2009 |
| 7,577,987 | Mizrah | August 2009 |
| 7,644,433 | Mizrah | January 2010 |
| 7,681,228 | Mizrah | March 2010 |
| 7,716,484 | Kaliski, Jr. | May 2010 |
| 7,725,730 | Juels, et al. | May 2010 |
| 7,849,321 | Mizrah | December 2010 |
| 8,006,300 | Mizrah | August 2011 |
| 20040119746 | Mizrah | June 2004 |
| 20040225899 | Mizrah | November 2004 |
| 20040123160 | Mizrah | June 2004 |
| 20120166809 | Barton et al. | June 2012 |
| 20120166791 | Barton et al. | June 2012 |

"Pass-Go, a New Graphical Password Scheme" by Hai Tao; Thesis submitted to the Faculty of Graduate and Postdoctoral Studies for the Master of Applied Science degree in Electrical and Computer Engineering .COPYRGT. Hai Tao, Ottawa, Canada, June 2006 110 pages University of Ottawa.

H. A. Bolande, "Forget passwords, what about pictures?" WSJ Interactive Edition, Nov. 27, 2000.

R. Dhamija et al., "Deja vu: A User Study Using Images for Authentication," SIMS/CS, Univ. CA Berkeley, http://paris.cs.berkeley.edu/%7Eperrig/projects/usenix2000/usenix.pdf.

W. H. Haubert III, "An Interactive Approach to Secure and Memorable Passwords," A Thesis in TCC 402 presented to the Faculty of School of Engineering and applied Science, Univ. of VA, Mar. 25, 2002, pp. 1-22.

I. Jermyn et al., "The Design and Analysis of Graphical Passwords," Proceedings of the 8th USENIX Security symposium, Washington, D.C. Aug. 23-26, 1999, 15 pp.

J. Lee, "And the Password is . . . Waterloo," New York Times, Dec. 27, 2001, 6 pp.

R. Lemos, "Passwords: The weakest Link?" CNET News.com, May 22, 2002, http://news/com.com/2009-1001-916719.html.

K. S. McCurley, "Protecting Privacy and Information Integrity of Computerized Medical Information," Sandia National Laboratories, Mar. 11, 1996, http://www.swcp.com/1mccurley/cs.sandia.gov/health/health.html.

A. Perrig et al., "Hash Visualization: a New Technique to improve Real-world Security," Computer Science Dept., Carnegie Mellon Univ., pp. 1-8, http://paris.cs.berkeley.edu/%7Eperrig/projects/validation/validatio-n/pdf.

M. Reynolds, "Microsoft TechFest Signposts Software Futures," Gartner Dataquest Perspective, Gartner, Inc., 2002.

"Deja vu: Using Images for User Authentication," Nov. 12, 2002, http://www.realuser.com/published/ScienceBehindPassfaces.pdf.

"The Science Behind Passfaces," September 2001, Real User Corporation, http://www.realuser.com/published/Science-BehindPassfaces.pdf.

European Search Report Mailed May 26, 2010 in application Ser. No. 07/114,710.2, 8 pages.

SUMMARY OF THE INVENTION

The present invention provides a system and method for establishing and strengthening a static credential to be used for probabilistic authentication and splitting it amongst two to N servers. Additional randomness can be added to a low randomness shared secret to make it harder to brute force. A simple example is adding a nonce or salt to a password before hashing it. For this invention, the strengthened shared secret can be split in such a way that all the elements must be assembled to generate the secret and that less than the total number of elements does not leak the secret itself. Once the split pieces are sent to different servers, if any one server is compromised, or any number of servers less than the max, then the shared secret should be very difficult, if not impossible to brute force. The invention shows examples of hashing, matrix multiplication and exponentiation as embodiments of one-way functions to derive the strengthened shared secret.

BRIEF DESCRIPTION OF THE DRAWINGS

FIG. 2 is an example of a session specific login operation grid.

DETAILED DESCRIPTION OF THE INVENTION

High Level Description

The system is, at its most simple instance, comprised of a stateless client, a primary server connected to a database, and a share server. The system scales to as many primary servers and share servers that are needed.

Figure 3:
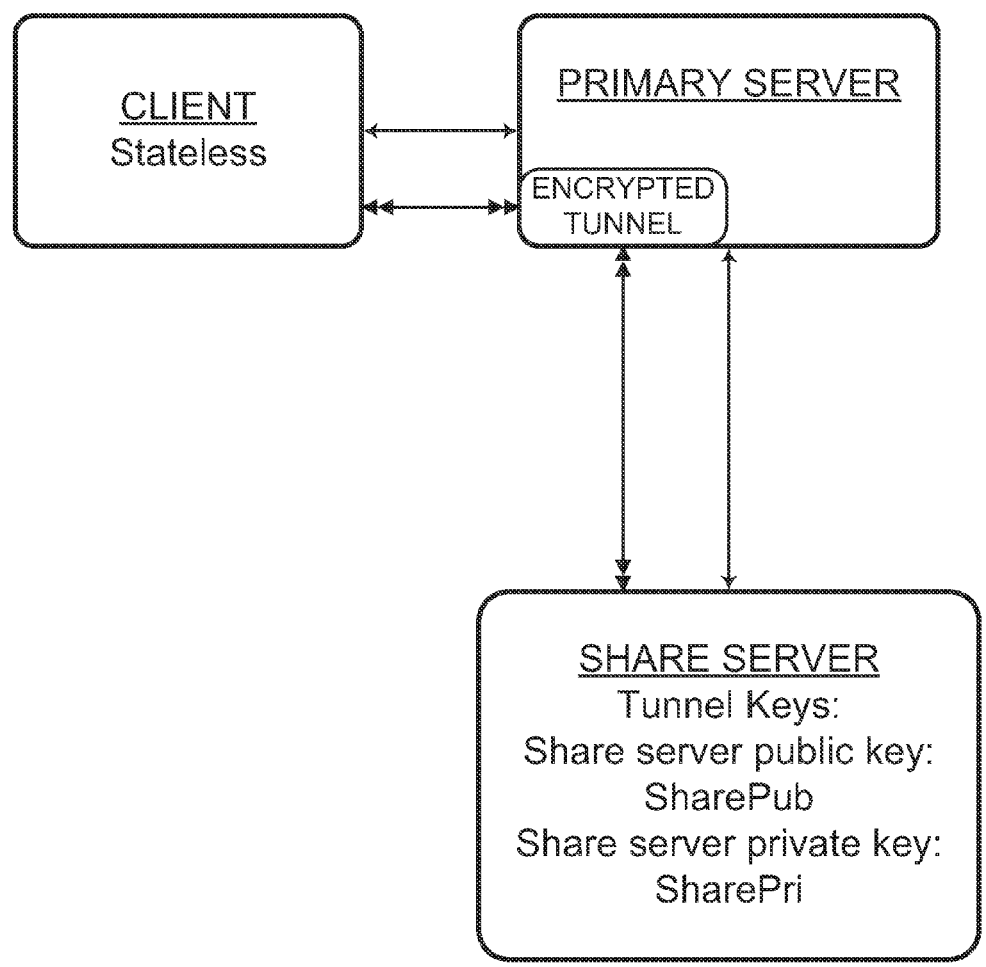
FIG. 3 is an example of the preferred embodiment architecture with the encrypted tunnel.

In a purely theoretical case a persistent client that has state could talk separately to each server; however, this is not practical to implement nor is it a standard practice. In a case where the client is a browser, it may not work at all since browsers block different domain communication to prevent cross site scripting and other security concerns. A practical environment that could be implemented, used, and easily integrated would consist of a browser, the stateless client; a primary server that communicates with memory accessible by the primary server such as a database; and one to N share servers that support the authentication procedures. The browser can be used to only communicate with the primary server (which could also be called the application server or first server), and the application server communicates with the share servers (or second servers). If the browser has a value to send to a share server that the primary server shouldn't know, it could be encrypted with the share server's public key, and forwarded through the primary server. See FIG. 3 as an example architecture for the encrypted tunnel between client and share server. When the information passes through the primary server, the primary server cannot read the information. This effectively creates an encrypted tunnel from the browser to the share servers and keeps intact the typical web based client server architecture.

In the preferred embodiments of this invention the client is stateless. This provides numerous benefits, the biggest of which is that it can run in a browser without any sort of persistent (browser plugins) or downloaded (Java applets) clients. Security conscious companies do not like to make their users download anything because a typical user is anything but diligent about security; they just want to consume a service, do their job, etc. In fact, users are almost always the weakest link in any security system. To minimize the impact of user negligence on the technology, the user is required to do nothing but interact with the authentication system that executes its protocol in a request/response, stateless manner. So, the preferred embodiments are acceptable and can be integrated to widest level of services. This is not to say the same protocol cannot be embedded into a client that saves its state and executes a full exchange between the client and server. For companies that have an easy way to distribute clients with state, or trusts their users to check, download and use the correct client, then the algorithm herein can easily be embedded into such an architecture and can benefit from it by taking advantages of industry standard algorithms, protocols, and security measures applied.

This art is only for use with a probabilistic front end. This means that there is a layer of transformation that can be a one-to-many mapping between the actual credential and the value the user enters on the front end. This can be called the mapping construct. In the example shown using FIG. 1 and FIG. 2, the one-to-many mapping is from a position on the grid (the credential) to the random content in that field of the grid (said content also occurring multiple times in other fields of the grid) during a authentication session. The user is performing a one-to-many mapping on the client, the server side must also perform a one-to-many mapping on the back end. In the case of the prior art example, the server for this art would map each content, the number that is the user response, to the ten positions on the grid that have that same content.

It is interesting to note that while the authentication is probabilistic, for any given set or session data there is one, and only one correct authentication response. This means that the authentication mechanism is checked in a probabilistic way. For a given set of session data, there is only one user response that will be correct.

There are two algorithmic preferred embodiments described herein for this invention, although others can be understood based on the description provided herein. One is a more minimal take on the storage of a static credential used for probabilistic authentication, and the second is a more intensive take on the same. For both cases a one-way function is used to hide information from the primary server and the share servers. A one-way function, or trap door function, is defined as an operation that is easy to perform going one-way and very difficult, if not impossible, going the other direction.

Additionally, each embodiment has two operations that must be taken into account and examined. The first is the credential creation operation since this is where the credential is split and stored and the authentication operation where the response is checked against the stored values. During the authentication operation all values that pass through the primary server to the share server can be encrypted for example with the share server's public key so there is an encrypted tunnel between the client and the share server. This means that the primary server is prevented from knowing the information that is being passed to the share server.

It is advantageous to have these two described types of embodiments. The first has less randomness but also fewer steps, less processing and less communication between servers. The second has extra sources of randomness that are stored in separate places but requires more processing and more server to server communication. In the real world of security there are no absolutes, nor any perfect solutions. There are bonuses and drawbacks to every decision. The described embodiments both solve how to protect a static credential used for probabilistic authentication, just in different ways which allow for choice in an actual implementation.

A Note on Back End Terminology

A static credential to be used for probabilistic authentication must be split into its elements. The elements can be strengthened by combining the element with a source of randomness. The algorithms used to describe the back end use a consistent notation for the credential elements and the source or randomness that is added by using various one-way functions:

The credential elements and possible credential elements are named M, even though the elements M may be computed in different ways.

The sources of randomness are named S and K (in the minimal case S is not used), which can be for example random numbers or matrices.

Furthermore, during credential creation all of the values for the credential elements, after they have been processed by the algorithm, are referred to either of the form KM or of the form SKM, even though the elements KM and SKM may be computed in different ways. Thus, this invention will associate the term 'processed credential element' to a credential element that has been processed by the back end algorithm.

The mapping construct, or transformation layer, on the server side is a virtual representation of the visual mapping construct from the client. On the client side the user maps their credential element to the session specific response or session values. On the server side the process is reversed and the session specific response is going through the mapping construct to generate all possible credential elements that are corresponding to the given session value. As an example, in FIG. 2 the grid is the mapping construct and the first position of the enumerated pattern (the credential element) has the number 5 in it (this is the session specific value). So on the client the user would respond to the first enumerated pattern position with 5. On the server side there is a virtualized, in memory, version of the grid (the mapping construct) and the server gets the session value of 5 (session specific response) and now maps it to the 10 positions on the grid (possible credential elements) that have the number 5 in them. For the authentication operation this set of 10 possible credential positions are named M. The authentication operations use of M is slightly different than the credential creation use of M. In the latter case (credential creation) all the M's are associated to the correct credential element. In the prior case (authentication), the M's are also associated to possible credential elements. The authentication algorithm also reuses the terms S and K. S and K are the same for both operations, they are the sources of randomness that are added and distributed in different ways, depending on the embodiment, between the primary and share server. So a response gets to the primary server and it goes through the mapping construct transforming the session response to a set of possible credential elements. Once the possible set of credential elements are processed by the algorithm, they can be called 'possible processed credential elements' or a 'set of possible of possible processed credential elements.'

The next term to clarify is the concept of the share server mixing the order of a set of possible processed credential elements. The reason that the share server does this is to ensure that, in the case of a successful authentication, the primary server does not know exactly which one of the ten possible processed credential elements is the correct match. The adjective mixed, scrambled, or any similar synonym can be used to describe this process.

Other terms to define include those used in explaining the how the primary server checks the correct processed credential element against the set of possible processed credential elements. Since the server merely checks to see if the value of the processed credential element matches one of the set of possible processed credential values, the process could simply be called checking the credential match value or, similarly, matching the credential value.

First Embodiment

Figure 4:
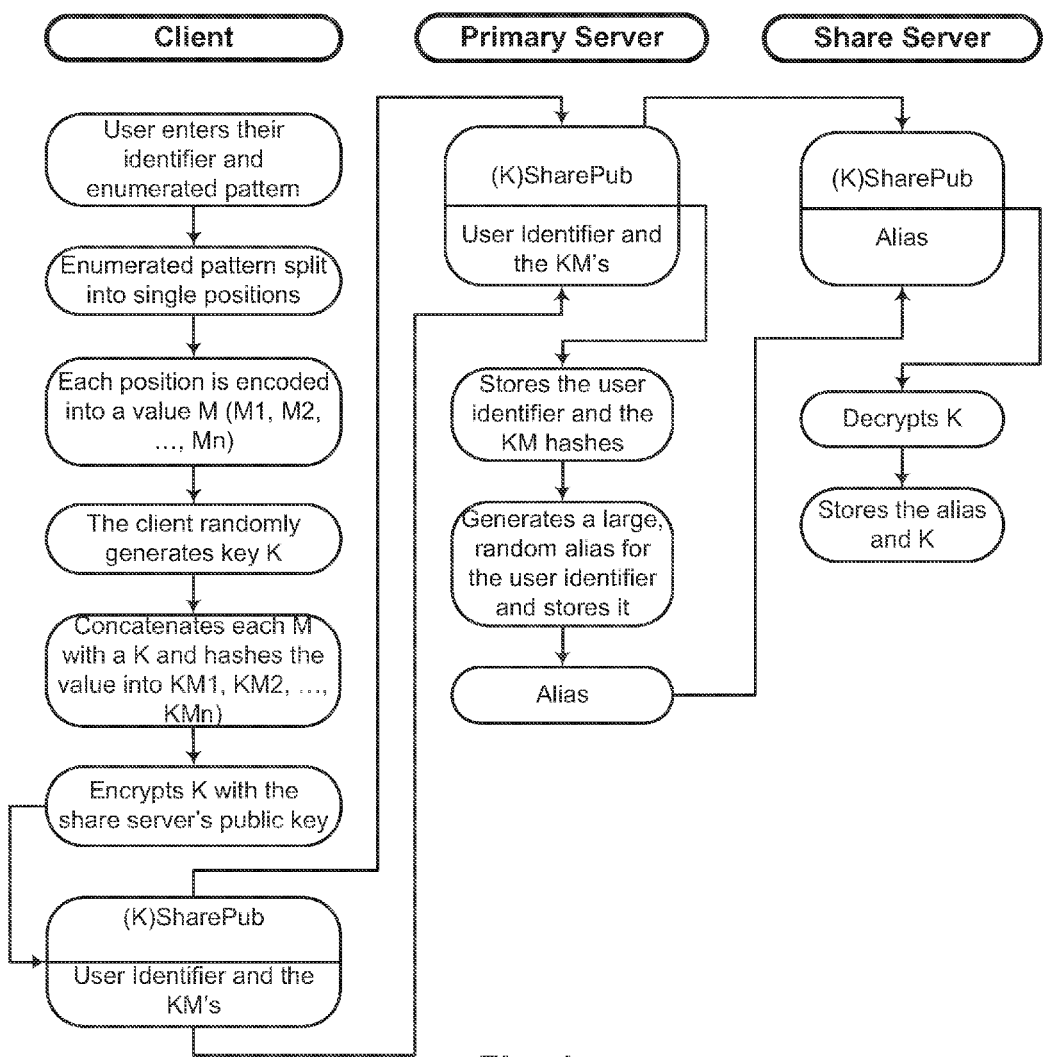
FIG. 4 is an example of a simplified enumerated pattern setup algorithm.

The first embodiment wherein the algorithm chosen is less complex will be detailed. The high level steps for a credential creation operation are as follows (also see FIG. 4):

1. A user enters an identifier and the credential in the client.
2. The client splits the credential into credential elements.
3. The client encodes each credential element into a value M (M1, M2, . . . , Mn).
4. The client randomly generates a value K.
5. The client uses a one-way function to calculate KM for each value M (KM1, KM2, . . . , KMn).
6. If not done so already (depends on the one-way function), the KM's should be hashed.
7. The client encrypts K with the share server's public key, so that K becomes protected data.
8. The client sends the user identifier, K and KM's to the primary server.
9. The primary stores the user identifier and the KM's. The hashed KM's together constitute a representation of the credential characterized by the condition that the primary server is prevented from determining the actual credential from the representation.
10. The primary server sends the encrypted K to the share server.
11. The share server decrypts K with its private key.
12. The share server stores K.

Figure 5:
FIG. 5 is an example of a simplified enumerated pattern authentication algorithm.

The second operation is login. Login is trickier to talk about in an abstract sense. The main issue is that the real credential is never entered in the client. Instead, using the mapping construct, the user enters a representation of that credential. Furthermore, their representations could be mapped to more than one credential. So there are two layers of 'mapping' that occurs. The first is done on the client via a graphic mapping construct and the second on the primary server via a virtual mapping construct. On the client side, the user performs an instruction that maps their exact credential to its representative value. On the server side, the representative value is mapped to all possible credential values (the essence of probabilistic authentication). The one-to-many mapping is preferred to be done on the primary server or elsewhere in server side resources because if it is done on the client, besides adding unnecessary processing on the client, it would also open a vector or attack where a malicious would not have to perform the mapping correctly. The high level steps for a login session (credential authentication) are as follows (also see FIG. 5):

1. The user enters their identifier.
2. The user identifies their credential response.
3. The representative session values of the credential response are entered and sent to the server.
4. The primary server maps the representative response to the possible credential responses for each credential character.
5. The primary server generates a value M based on maps for each character of the credential.
6. The primary server sends the possible M values to the share server.
7. The share server looks up K.
8. The share server uses a one-way function to calculate KM for each possible M value for each response session value.
9. If not done so already (depends on the one-way function), the KM's should be hashed.
10. The share server mixes the order of the hashes.
11. The share server sends the hashes back to the primary server.
12. The primary server now has possible hashes corresponding to each character response of the credential.
13. The primary server checks the possible hashed responses for the given credential position against the stored hash.
14. If any one of the possible hashes for a given session value match one of the stored values then it is a valid response.
15. Although the primary server knows there is a match, he does not know which position it was (since the secondary server mixed the order of the hashes).
16. If all the credential characters have a match, then the user is authenticated.

Second Embodiment

Figure 6:
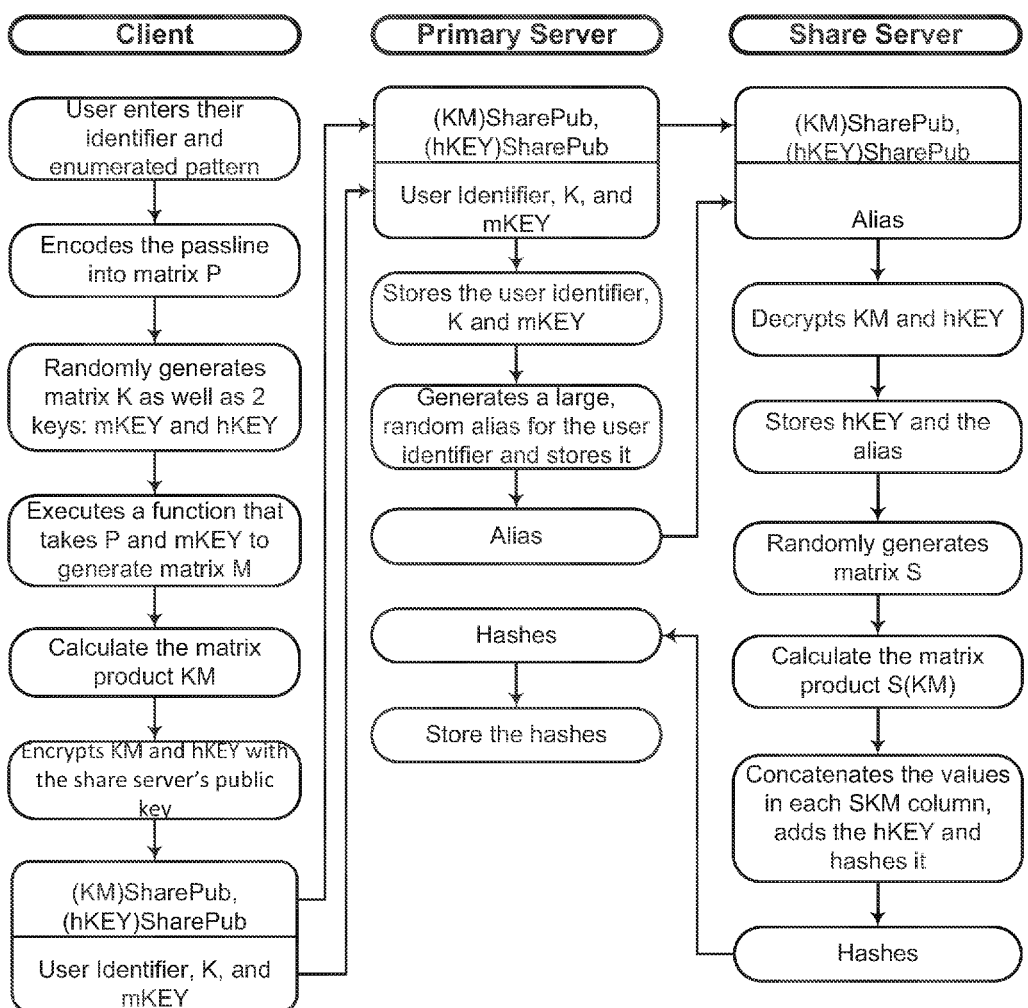
FIG. 6 is an example of a more in depth enumerated pattern setup algorithm.

The second embodiment wherein the algorithm is more security conscious will be detailed. The high level steps for credential creation are as follows (also see FIG. 6):

1. A user enters an identifier and the credential in the client.
2. The client splits the credential into elements and encodes each one into a value M (M1, M2, . . . , Mn).
3. The client randomly generates a value K.
4. The client uses a one-way function to calculate KM for each value M (KM1, KM2, . . . , KMn) in the authentication credential.
5. The client encrypts all the KM's with the share server's public key.
6. The client sends the user identifier, K and encrypted KM's to the primary server, so that the KM's become protected data.
7. The primary stores the user identifier and K.
8. The primary server sends the encrypted KM's to the share server.
9. The share server decrypts the KM's with its private key.
10. The share server generates a random value S.
11. The share uses a one-way function to calculate SKM for each KM (SKM1, SKM2, . . . , SKMn).
12. If not done so already (depends on the one-way function), the SKM's should be hashed.
13. The share server hashes the SKM values. The hashed SKM's together constitute a representation of the credential characterized by the condition that the primary server is prevented from determining the actual credential from the representation.
14. The shares server sends the hashes to the primary.
15. The primary server stores the hashes.

The second operation is login. The authentication text that was written for the previous embodiment applies directly to the second embodiment as well (as this is the part that is the essence of probabilistic authentication). To repeat the text since is not just relevant, but necessary:

Login is trickier to talk about in an abstract sense. The main issue is that the real credential is never entered in the client. Instead, using the mapping construct, the user enters a representation of that credential. Furthermore, their representations could be mapped to more than one credential. So there are two layers of 'mapping' that occurs. The first is done on the client via a graphic mapping construct and the second on the primary server via a virtual mapping construct. On the client side, the user performs an instruction that maps their exact credential to its representative value. On the server side, the representative value is mapped to all possible credential values (the essence of probabilistic authentication). The one-to-many mapping is preferred to be done on the primary server or elsewhere in server side resources because if it is done on the client, besides adding unnecessary processing on the client, it would also open a vector or attack where a malicious would not have to perform the mapping correctly.

Figure 7:
FIG. 7 is an example of a more in depth enumerated pattern authentication algorithm.

The high level steps for a login session (credential authentication) can be as follows (also see FIG. 7):

1. The user enters their identifier.
2. The user identifies their credential response.
3. The representative session value of each element of the credential response is entered and sent to the server.
4. The primary server maps the session value to the possible credential responses for each credential parameter.
5. The primary server generates a value M based on maps for each character of the credential.
6. The primary server looks up K.
7. The primary server uses a one-way function to calculate all the KM values (same K, multiple M's) providing a set of intermediate values for each session value.
8. The KM's are sent to the share server.
9. The share server looks up S.
10. The share server uses a one-way function to calculate SKM.
11. If not done so already (depends on the one-way function), the SKM's should be hashed.
12. The share server mixes the order of the hashes.
13. The share server sends the hashes back to the primary server.
14. The primary server now has a set of possible hashes corresponding to each session value in the response.
15. The primary server checks the possible SKM hashes for the given session value against the stored SKM hashes in the representation of the credential.
16. If any one of the possible SKM hashes matches one of the stored values, then it is a valid response.
17. Although the primary server knows there is a match, he does not know which position it was (since the secondary server mixed the order of the hashes).
18. If all the session values have a match, then the user is authenticated.

Specific Examples of the Preferred Embodiments

The high level detailed description describes an invention that increases a static credential's security in back end storage that will be used for probabilistic authentication. To talk about an explicit example, a specific front end must be chosen. This front end will merely be one of many probabilistic front ends. Indeed, any front end that is probabilistic can benefit on the back end from this invention. The second requirement that is a major component to the solution on the back end is the use of a one-way, also called a one-way trapdoor, function (http://en.wikipedia.org/wiki/Trapdoor_one-way_function). There are well tested functions. However, once again, to be able to describe a specific example one of them must be chosen.

The three specific examples to be shown will use an enumerated pattern with the RPDPR algorithm as the probabilistic front end. While there are many probabilistic front ends, RPDPR adds additional benefits to the front end by using a random challenge and response to decrease the entropy leakage. The example used to describe a probabilistic front end above, in conjunction with FIGS. 1 and 2, will be the same front end system used in both of the following specific examples.

The examples described need a one-way function to be used to provide part of the security of the solution on the back end. The first example will use a standard, well-known one-way function: a hash. The second example will use a non-standard example using matrices. The third example will use an exponentiation based approach.

So, three specific, illustrative examples of embodiments—one using the first "KM" based embodiment and two examples for the second "SKM" based embodiment—will be shown. The probabilistic front end that will be used for both is an enumerated pattern based credentials and the RPDPR algorithm.

Enumerated Pattern Using Hashes
Credential Setup

The steps for setup are as follows (also see FIG. 4):
1. A user enters an identifier and the enumerated pattern credential in the client.
2. The enumerated pattern is split apart into single credential elements.
3. The client encodes credential element into a value M (M1, M2, . . . , Mn).
4. The client randomly generates key K.
5. The client concatenates each M with a K and hashes the value into KM1, KM2, . . . , KMn.
6. The client encrypts K with the share server's public key, so that K becomes protected data.
7. The client sends the user identifier, the encrypted K and the KM's to the primary server.
8. The primary stores the user identifier and KM's.
9. The primary server sends the encrypted K to the share server.
10. The share server decrypts K with its private key.
11. The share server stores K.

Probabilistic Authentication

The steps for authentication are as follows (also see FIG. 5):
1. The user enters their identifier and the enumerated pattern response as digital content.
2. The user identifier also called client identifier herein) and digital content is sent to the primary server.
3. The primary server matches the digital content (session values) to the grid positions. There will be 10 positions that correspond to each consecutive session value in the response.
4. The primary server generates 10 M's based on these 10 positions for each enumerated pattern position providing a set of intermediate values for each session value.
5. The primary server looks up alias for the user identifier.
6. The primary server sends the alias and the 10 different M's for each response to the share server.
7. The share server looks up the value K for the alias.
8. The share server concatenates K with each M and hashes it into KM.
9. The share server mixes the order that the M's were sent in.
10. The primary server now has 10 possible hashes (possible credential element match values) for each enumerated pattern position response.
11. The primary server checks the 10 hashes for each position against the corresponding stored hash.
12. If any one of the 10 hashes matches the corresponding stored hash, then it is a valid response.
13. Although the primary server knows that 1 of the 10 is a match, it does not know which position it was (since the secondary (the share server) server mixed the order).
14. If all the positions have a match, the user is authenticated.

The alias of the user identifier mentioned in steps 6 and 7 above, and in other examples provided in the present description, improves security in some circumstances, but can be an optional feature. In some embodiments, it may be stored with the data set associated with the client identifiers in the primary server. In some embodiments, it may be generated only when needed. In other embodiments, the client identifier or other type of linking data structure can be used for coordination between the primary and share servers.

Enumerated Pattern Using Matrices
Credential Setup

For credential setup at the client, a user enters their user identifier and chosen enumerated pattern which is encoded into a singular matrix P. A random key, mKEY, is used with a function to combine P and mKEY into a new singular matrix. A random matrix K is generated. The matrix product KM is calculated. A hash key, hKEY is generated. The user identifier, K, mKEY, KM and hKEY—the KM and hKEY values are encrypted with the share server's public key—are sent to the primary server. The primary server stores the user identifier, stores the random matrix K (which could also be sent to a different server) and stores the mKEY. The primary server sends the encrypted KM and hKEY to the share server. The share server decrypts KM and hKEY and stores hKEY. The share server generates a random S matrix. The matrix product SKM is calculated. For every column of SKM the column values will all be concatenated together with hKEY and hashed. Each column number corresponds to the enumerated pattern position. For example, column one concatenated with hKEY and hashed will be stored as the first enumerated pattern position credential. The hashes will be sent back to the primary server to be stored. The steps are as follows (also see FIG. 6):
1. A user enters an identifier and the enumerated pattern credential in the client.
2. The client encodes the enumerated pattern into a matrix P.
3. The client randomly generates matrix K.
4. The client randomly generates a matrix key mKEY.
5. The client randomly generates a hash key hKEY.
6. The client generates matrix M which is derived by a function that takes P and mKEY (a function of the elements of the credential and the matrix key).
7. The client calculates the matrix product KM.
8. The client encrypts KM and hKEY with the share server's public key so that the matrices KM and hKEY become protected data.

9. The client sends the user identifier, K and mKEY, and the encrypted KM and hKEY to the primary server.
10. The primary server stores the user identifier, K and mKEY.
11. The primary server generates a large, random alias for the user identifier and stores it.
12. The primary server sends the alias, encrypted KM and hKEY to the share server.
13. The share server decrypts KM and hKEY.
14. The share server stores hKEY and the alias.
15. The share server random generates matrix S.
16. The share server calculates the matrix product S(KM).
17. The share server concatenates the values in each column, adds the hKEY and hashes it.
18. The shares server sends the hashes to the primary.
19. The primary server stores the hashes, where the hashes become a representation of the credential.

Probabilistic Authentication

The second operation is login. It is not good for the user to enter the exact enumerated pattern position on the grid into the browser for login (this would make it deterministic authentication). Since, if the browser is compromised, then the user would lose those positions that were challenged. It is better front end security to only use the digital content of the grid, and not the actual positions. In a 10×10 grid there are 100 fields. If the numbers 1 to 10 are used as an equal distribution, then there will be 10 of each number distributed randomly through the grid. See FIG. 2 for an example. This is important to the algorithm because the client doesn't even know what position is being responded to. If the client cannot tell, then no malicious software can either. The digital content response, as a number in our example, is mapped to the possible positions at the primary server, then sent to the share server for the share server processing. Post processing the share server mixes the order of the responses so while the primary server will know one of the 10 positions is correct, it will not know exactly which one it was. This example of an embodiment of the back end is using the first front end embodiment. The steps for login are as follows (also see FIG. 7):

1. The user enters their identifier and the enumerated pattern response as digital content.
2. The user identifier and digital content is sent to the primary server.
3. The primary server matches the digital content to the grid positions. There will be 10 positions that correspond to each consecutive number in the response.
4. The primary server generates 10 matrixes P's based on these 10 positions for each enumerated pattern position.
5. The primary server uses a function that takes mKEY and P to generate 10 matrix M's.
6. The primary server calculates 10 matrix products KM providing a set of intermediate values for each session value.
7. The primary server looks up alias for the user identifier.
8. The primary server sends the alias and the 10 different KM's are sent to the share server.
9. The share server uses the alias to look up S and hKEY.
10. The share server calculates 10 matrix products for SKM.
11. The share server concatenates the values in each column, adds the hKEY and hashes it.
12. The share server mixes the order that the SKMs were sent.
13. The share server sends the hashes back to the primary server.
14. The primary server now has 10 hashes (possible credential element match values) for each enumerated pattern position.
15. The primary server checks the 10 hashes for each position against the corresponding stored hash.
16. If any one of the 10 hashes matches the corresponding stored hash, then it is a valid response.
17. Although the primary server knows that 1 of the 10 is a match, it does not know which position it was (since the secondary server mixed the order).
18. If all the positions have a match, the user is authenticated.

Enumerated Pattern Using Exponentiation

Another example of the second "SKM" embodiment will be described using exponentiation as the one-way function that is a well-known standard that used in the industry. This will be a good comparison of the algorithmic method of the second embodiment by showing the difference between an industry standard one-way function (exponentiation) and a non-standard one-way function (matrices).

Credential Setup

To make a quick preamble on the notation differences used. Using the well-known notation the generator is typically called 'g' and the exponents used are typically called 'a' and 'b'. For this example, the same terminology and variable names used throughout this invention the notation will be the same. As such, it is good to explicitly show which variables are the same: g is M, a is K, and b is S.

The steps are as follows:

1. A user enters an identifier and the enumerated pattern credential in the client.
2. The client splits the credential into elements.
3. The client encodes each credential element into a value P (P1, P2, . . . , Pn).
4. The client randomly generates value K.
5. The client randomly generates a first key mKEY.
6. The client randomly generates a hash key hKEY.
7. The client creates generators M (M1, M2, . . . , Mn) which is derived by a function that takes P and mKEY.
8. The client calculates value for M^K for all M's and they are named KM (KM1, KM2, . . . , KMn).
9. The client encrypts KM and hKEY with the share server's public key, so that KM and hKEY become protected data.
10. The client sends the user identifier, K and mKEY, and the encrypted KM and hKEY to the primary server.
11. The primary server stores the user identifier, K and mKEY.
12. The primary server generates a large, random alias for the user identifier and stores it.
13. The primary server sends the alias, encrypted KM's and hKEY to the share server.
14. The share server decrypts KM's and hKEY.
15. The share server stores hKEY and the alias.
16. The share server random generates value S.
17. The share server calculates the values for KM^S and they are named SKM (SKM1, SKM2, . . . , SKMn).
18. The share server adds the hKEY to each SKM value and hashes it.
19. The share server sends the hashes to the primary, where the hashes become a representation of the credential.
20. The primary server stores the hashes.

Probabilistic Authentication

The steps for login are as follows:

1. The user enters their identifier and the enumerated pattern response as digital content.

2. The user identifier and digital content is sent to the primary server.
3. The primary server matches the digital content to the grid positions. There will be 10 positions that correspond to each consecutive number in the response.
4. The primary server generates 10 values P's based on these 10 positions for each enumerated pattern position.
5. The primary server uses a function that takes mKEY and P to generate 10 values M.
6. The primary server generates the value KM by calculating K^M for each value of M, providing a set of intermediate values for each session value.
7. The primary server looks up alias for the user identifier.
8. The primary server sends the alias and the 10 different KM's are sent to the share server.
9. The share server uses the alias to look up S and hKEY.
10. The share server generated the 10 values for SKM by calculating KM^S.
11. The share server concatenates the values in each column, adds the hKEY and hashes it.
12. The share server mixes the order that the SKMs were sent.
13. The share server sends the hashes back to the primary server.
14. The primary server now has 10 hashes (possible credential element match values) for each enumerated pattern position.
15. The primary server checks the 10 hashes for each position against the corresponding stored hash.
16. If any one of the 10 hashes matches the corresponding stored hash, then it is a valid response.
17. Although the primary server knows that 1 of the 10 is a match, it does not know which position it was (since the secondary server mixed the order).
18. If all the positions have a match, the user is authenticated.

Splitting the Secret Between the Primary and Shared Servers

The previous examples use a single share server and single primary server. Splitting the functions between servers provides a layer of practical security absent in a single server case. There are many architectures that could work for the implementation. However, the base premise is that no single person—same type or person/admin, role, or otherwise—will be able to get access to the data from both the primary and share servers. An easy way to achieve the desired behavior is to physically split the primary and share servers between two different computing networks, such as networks in different campuses for a single company or for different companies, so that each server would be serviced and maintained by separate personal so the risk of both data sets from the primary and share server being lost is minimal. The communication between the two servers could be in the clear, or, more ideally, through either a machine authenticated or a non-authenticated, encryption channel. An alternate arrangement is for both primary and share servers to both be deployed in the same network. The servers could be placed in different security zones so different administrators service and maintain the different servers. The data sets themselves could be in one or more standard databases, organized using distributed directory information services such as the Lightweight Directory Access Protocol (LDAP), flat files, or any other capable storage structure. Again, the goal is not to let any one person have access to both. So, as an example, if both the primary and share server stored their data sets in separate databases then the database administers that have access to the primary server's database should not have access to the share server's database and vice versa. As another satisfactory example is if the primary server is using a LDAP (which is serviced and maintained by LDAP administrators) and the share server is using a database (which is serviced and maintained by database administrators, which are different than the LDAP administrators). Additionally any industry standard types of encryption can be used. This includes things like HSM (Hardware Security Module, http://en.wikipedia.org/wiki/Hardware_security_module)—which works on a similar principle: HSM and its encryption keys are typically owned by application administrators who cannot get to the data to decrypt it; database administrators can get to the data but can't get to the keys to decrypt the data.

Multiple Servers to Scale Up the Secret Distribution

Figure 8:
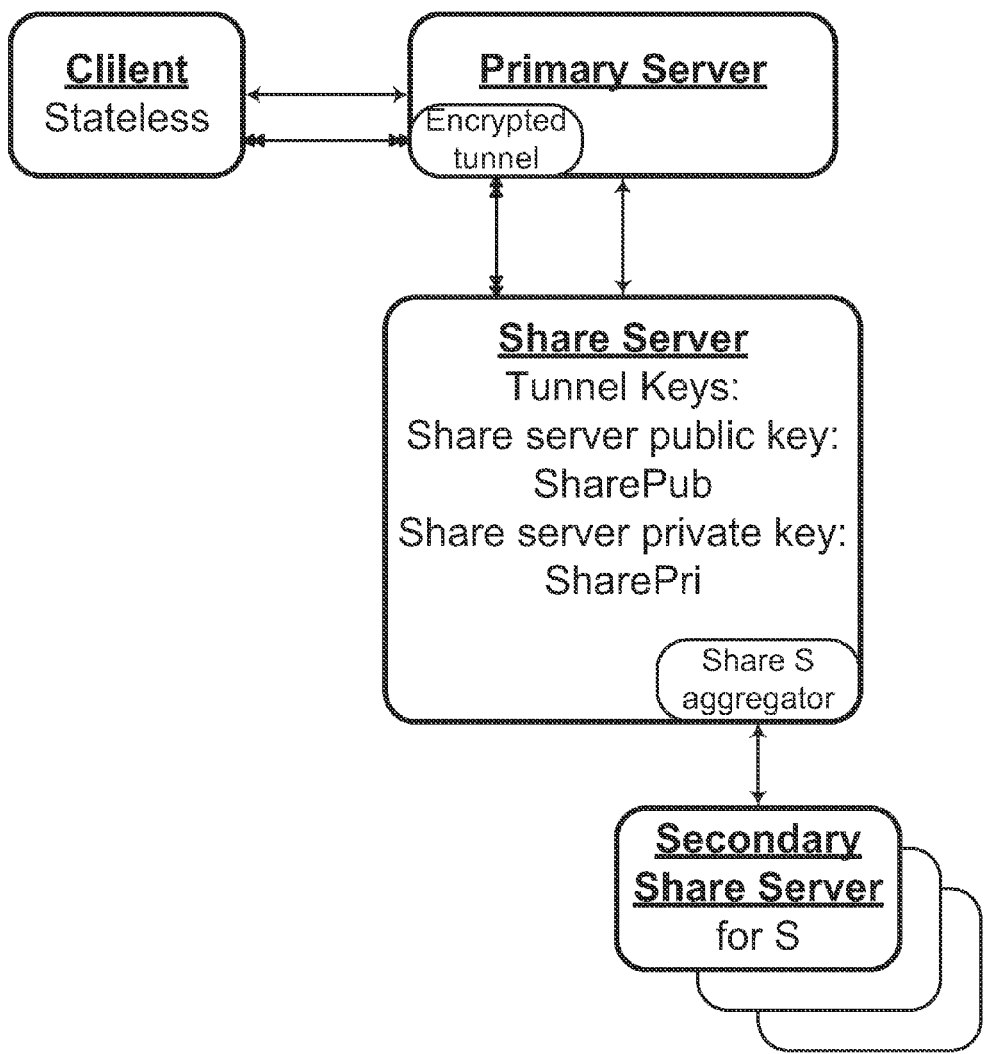
FIG. 8 is a first example of architecture of how the credential shares could be separated.

There are many different ways to split the shares, when using more than one share server and more than one primary server. Here are two example embodiments using matrices as their one-way function:

Have a primary share server that gets the S shares from subordinated share servers (FIG. 8). So the primary share server would get a KM. The primary share server would send KM to the N share servers: server1, server2, serverN. The enumerated servers would send back the SKM values, S1(KM), S2(KM), SN(KM). The primary share server could combine the shares (say, by adding) and generate SKM. Then, the columns could be concatenated and hashed and sent back to the primary server. In this model the primary share server acts as an aggregator for the shares of S split amongst the other share servers. A slight modification could make the primary share also have one of the shares.

Figure 9:
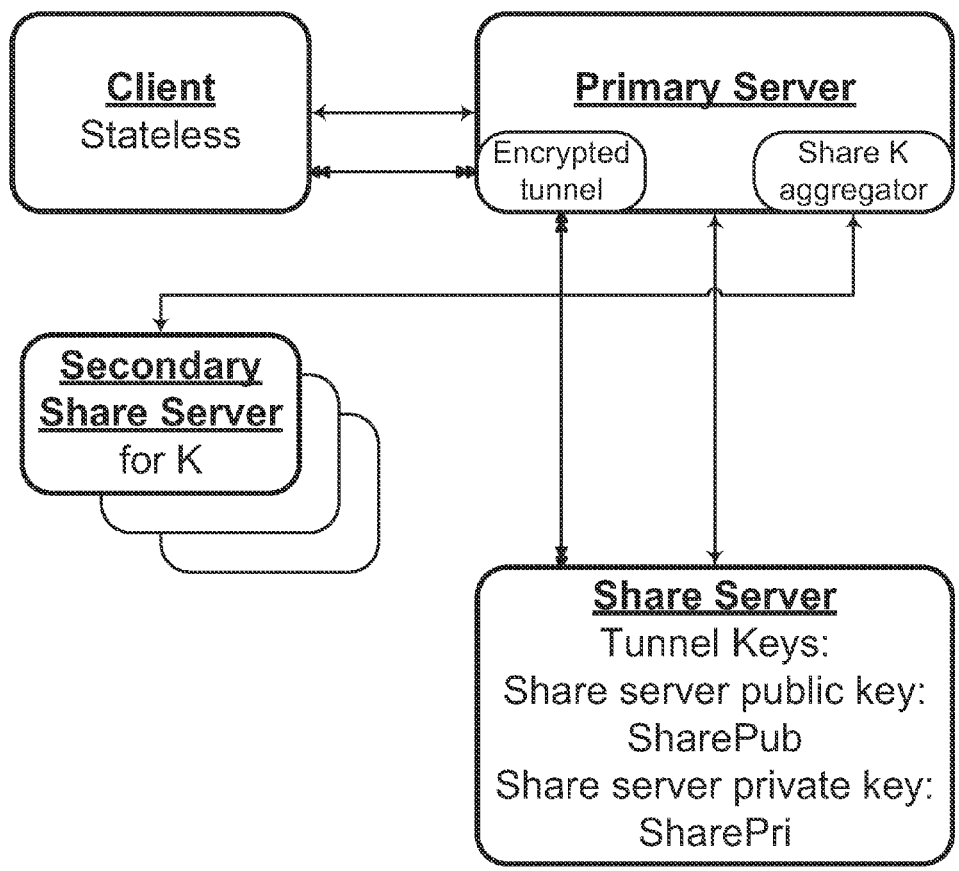
FIG. 9 is a second example of architecture of how the credential shares could be separated.

Have the primary server split the K value and store the split K on different servers (FIG. 9). So the original K value could be split into K1 to KN shares. During login, when a candidate M is generated, it would be sent to the share server's server1 to serverN. They would send back K1M, K2M, KNM. This does not compromise the static credential stored for probabilistic authentication because each M may or not have a correct value, and the share servers will never know which one, if any, are good. The primary server could combine the shares together to get KM, and then KM could be sent to the share server that stores S. SKM would be calculated, hashed, and returned as normal from there.

It is beneficial to have these two options since they offer different ways to integrate into an existing architecture. The first option introduces changes in code to the share server to retrieve and combine the shares. The second option introduces changes in the primary server code to retrieve and combine the shares. Either one has about the same complexity since the code would be almost the same. The first option has an advantage in that multiple shares could be turned on dynamically post installation much easier (the primary server is not changed). The second option has an advantage in that the share K is no longer stored in the primary database with the user identifiers and the hashes and other potentially sensitive information that is a target for attackers, which increases the security of the enumerated pattern credential in the primary database.

Figure 10:
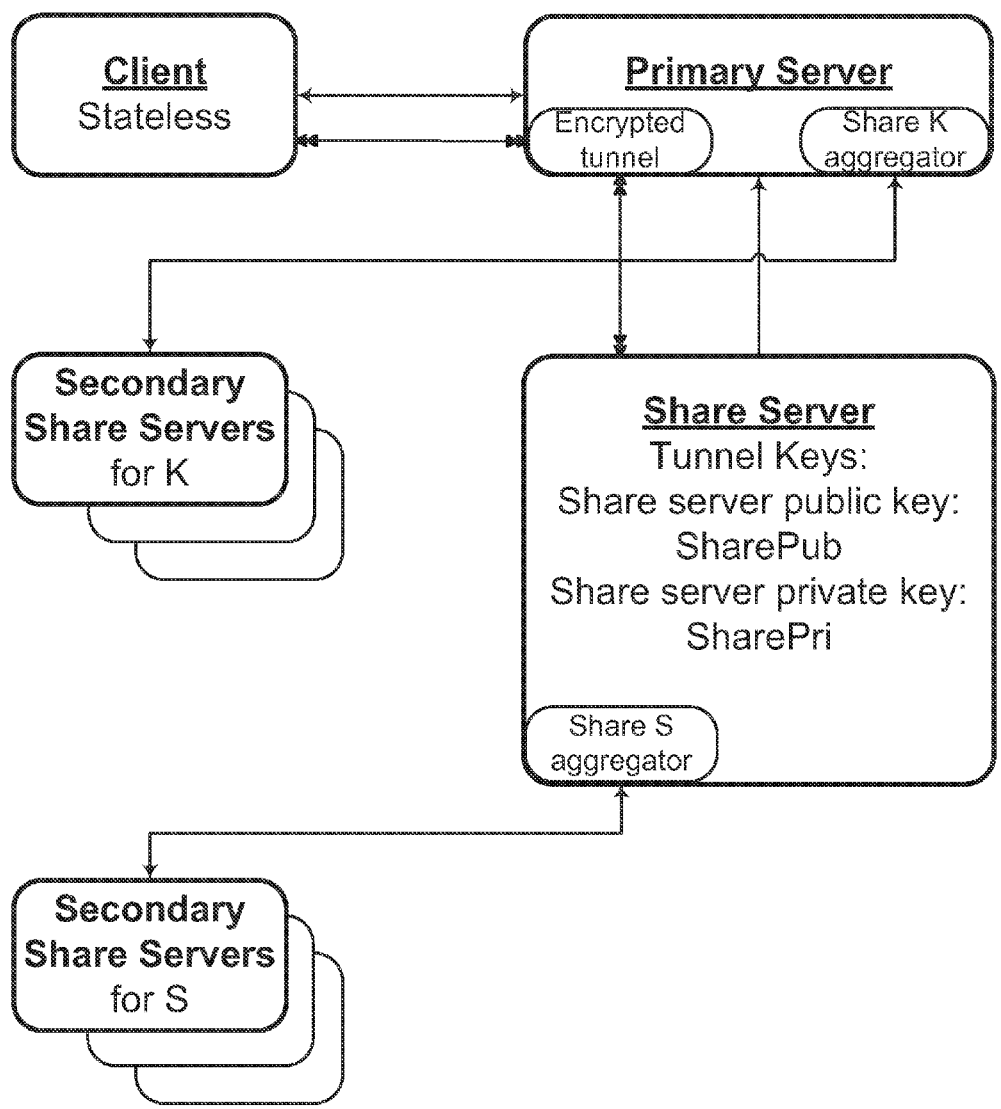
FIG. 10 is a third example of architecture of how the credential shares could be separated.

There is also a third option (see FIG. 10) that would combine both of the above methods to split shares amongst extra servers. So both K and S would be split into shares for secondary servers. This could be introduced in an environment where security is of the utmost importance.

General Matrix Security Conditions

The security of the standard one-way functions like hashes and exponentiation are well-known and need not be analyzed. The security of the matrix method is non-standard and requires a more in depth analysis.

There are 3 different matrices being used in the algorithms described, they are: S, K, and M. P can potentially be a matrix as well, but it is transient and is only used to be passed into a function that ultimately creates the matrix M, which is important to the security of the system.

U.S. Pat. App. No. 20120166809 and U.S. Pat. App. No. 20120166791 by the same authors describe the security considerations for the matrices in great detail.

As a quick summary:

Of the four, the requirements for M in this example are the most rigid. Matrix M must be a square matrix and must also be singular. Further, the rows of M should all be the same, this M is a singular matrix of rank 1 (meaning all of the rows are the same), which is important to the security of the system. The enumerated pattern response is encoded into a matrix P first and then matrix P and a random value, called the matrix key (mKEY), are passed into a function that generates the matrix M according to the security requirements listed for M. Alternatively, the enumerated pattern response can be encoded into a key, number, or string and added to the random value mKEY and passed into a function that generates the matrix M according to the security requirements listed for M. An embodiment of this function could add some random values to the values in P while still making sure that the M is of the correct geometry and singular with rank 1.

S and K are more flexible. They can also be square, which is the ideal case since all the secrets should be of the same size. However, S and K can also be non-square as long as they have the correct geometries for matrix multiplication. The values in S and K can, and should, be completely random.

Enumerated Pattern Setup Security Conditions

First and foremost, the security of a credential is most vulnerable during its setup. If malware is present, or even something as simple as screen scraping, any credential, either deterministic or probabilistic is not safe to use since it has been compromised. The assumption of the security of the setup operation is that the user is on a front end (i.e. a browser as the client), that has not been compromised, nor has the back end (the servers and ISP backbone) been compromised.

The primary requirements of the setup operation are a (pseudo) random number generator (RNG) and asymmetric encryption. The reason for the RNG is obvious, the client needs to generate random values used in strengthening the credential and sent to the server. The reason for the asymmetric key encryption is to be able to talk to a single server—per typical web architecture that anyone skilled in the art would recognize—but hide the information from the first server that only the second server should know. This is in accordance to general principles of secret sharing in which any given secret should only be known to one of the participants. To put it more plainly, if the first server knew the information that only the second sever should have, than the security of the system is weakened, and in a worst case scenario broken.

The short description of the security of the first embodiment is thus: the user knows the secret (encoded, ultimately, into M), the primary server knows KM, and the share server knows K. Even knowing potential M's the primary cannot determine K. The share never know if the potential M's it is sent are a correct response or not. The primary does not know exactly which of the potential M's are correct since the share mixes them before sending them back to the primary.

The short description of the security of the second embodiment is thus: the user knows the secret (encoded, ultimately, into M), the primary server knows K, and the share server knows S. Technically speaking, the client also knows the K value (which was randomly generated on the client). However, in the assumptions we state that the client has not been compromised. If the client had, in fact been compromised, the lost value of K is moot since the entire credential has been compromised. Continuing, the secondary server gets a value of KM, but does not know K or M, thus has no way to reconstruct either value (the primary server and users secrets). The secondary server then generates S and creates SKM which has hKEY added to it, and whose columns are hashed. The hashes are sent back to the primary sever. To be able to 'break' the hashes, the primary server would have to figure out both S and hKEY. Since the sizes of both S and hKEY can be scaled both up and down, the brute force size can be modified to fit with any level that is needed. However, at even fairly normal sizes, say a 20×20 matrix and a 256 bit key, the sheer number of permutations is staggering and well outside the current processing power of today's computers.

Enumerated Pattern Login Security Conditions

As stated in the prior section the security of a credential is most vulnerable during its setup. If malware is present, or even something as simple as screen scraping, any credential, either deterministic or probabilistic is not safe to use since it has been compromised. However, this is a one-time operation and once complete, the user will perform many more login operations than the single setup operation. This changes the consideration for the security requirements in two ways: first, the security of login is more important because that's where users spend more of their time and second, cryptographic operations in login produce lag which the user encounters much more often (it is easy to assume that a user logs into a service multiple times a day) and thus degrade the users login experience. So the paradox is that login needs to be both more secure and faster than setup.

In this art, the front end (say, a web browser) does not need to do any processing of the response at all. This is an improvement upon any of the deterministic algorithms, which by definition, must hide and/or veil the one-and-only-one correct response. In a probabilistic system, the very nature of the response is that it need not be hidden. So the user is presented with a challenge and sends back a response. This correspondence can still benefit for any industry standard types of encryption like transport layer security (TLS).

The analysis for this art only really starts once the response gets to the primary server. The response from the user maps (using a 10×10 grid with the numbers from 1 to 10 each used 10 times) from a single response to ten possible positions (by encoding the response into P, and then using mKEY and a function to generate M) on the grid that can be the correct credential position. For each of the 10 M's per response, the primary server generates 10 KM's by using its own secret K. These KM's are sent to the secondary server. Once again, the share server cannot determine either K or M, since it knows neither. The share server multiplies the multitude of KM's by its secret S. Then, the share server adds the hKEY and hashes the columns. Then, and this is important, the share server scrambles the order in which the hashed columns will be sent back to the primary server. This is so the primary server cannot determine, if there is a correct response, which of the ten are actually correct. The primary server that has generated ten M's for each response, and then generated ten KM's, and then the share server generated ten SKM's, and then hashed the columns and scrambled them, and now the primary server looks up the value of the actual credential position (the SKM hashed position including the mKEY and hKEY) from credential setup. If the stored credential hash is in one of the ten, then it is a valid response for that challenge. Since the ten hashes were scrambled, the primary server does not know, with a valid authentication match, which of the ten positions from the grid is the correct credential position. The primary server only knows that one of the ten is a correct match. This is, of course, why this is a probabilistic authentication but also lends security to the primary server since, even if it is compromised, an attacker cannot map the correct credential position.

An Example of Generating Matrix P

The following is an illustrative example of generating the matrix P as used in the second embodiment, but not an exhaustive list of how to do so. There are many ways and geometries that would work for the generation of P.

Figure 1:
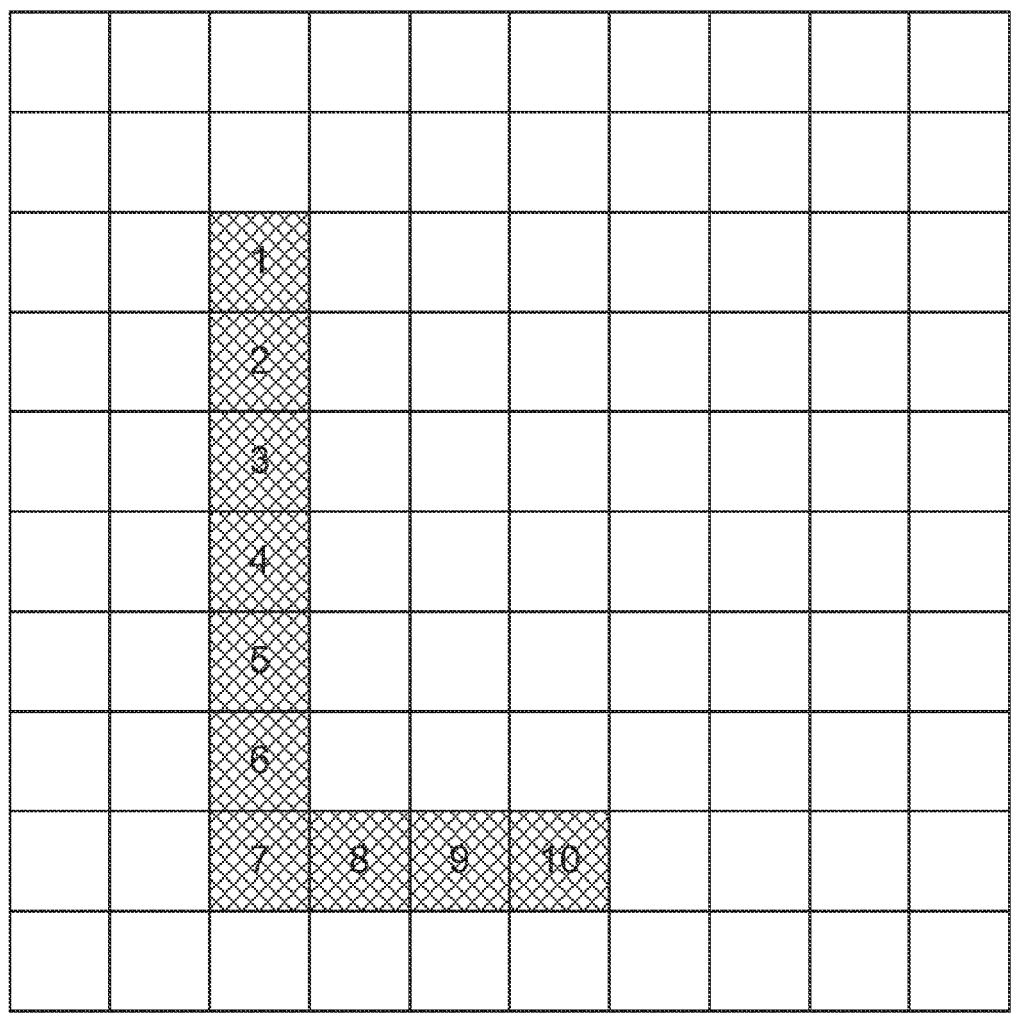
FIG. 1 is an example of a credential creation grid with a specified enumerated pattern based credential.

Given an enumerated pattern that is the 'L' from FIG. 1.
Given a challenge of: 1, 3, 5 and 10
Give the random session generated 10×10 grid filled with digital content from FIG. 2.
The enumerated pattern response would be: 5, 1, 10, and 8
In other words:
The digital content in enumerated pattern position 1 is 5.
The digital content in enumerated pattern position 3 is 1.
The digital content in enumerated pattern position 5 is 10.
The digital content in enumerated pattern position 10 is 8.
These numbers are the digital content of the grid. The first response to challenge 1 is digital content 5. There are 10 5's on the grid. The grid positions are enumerated from 1 to 100 (1 being the upper left field and 100 being the bottom right field, the enumeration proceeds from left to right and from top to bottom row). All the grid field positions that have the digital content of 5 in them are listed.

Positions with digital content of 5 are:
2, 6, 15, 21, 23 (the correct position), 39, 57, 61, 87, and 89
The 10 positions are mapped for the other responses as well.
To just get the first position of each:
The first grid field position of digital content 1 is 5
The first grid field position of digital content 10 is 1
The first grid field position of digital content 8 is 14

The 10 matrix P's (since there are 10 positions that map to each digital content response) are created based on the positions that were mapped from the digital content. The position goes in the column that matches the enumerated pattern position (the challenge). These matrices include possible parameters (grid locations) in the parameter set to which the corresponding session value of the response can be mapped. M has certain restrictions on it so it must be formed in a particular way. Given that P is a 10×10 matrix (it could be any size as long as it's square), the first P is generated by the first grid field position found for the digital content and it would be:

| 2 | X | 5 | X | X | 1 | X | X | X | X | 14 |
| 2 | X | 5 | X | X | 1 | X | X | X | X | 14 |
| 2 | X | 5 | X | X | 1 | X | X | X | X | 14 |
| 2 | X | 5 | X | X | 1 | X | X | X | X | 14 |
| 2 | X | 5 | X | X | 1 | X | X | X | X | 14 |
| 2 | X | 5 | X | X | 1 | X | X | X | X | 14 |
| 2 | X | 5 | X | X | 1 | X | X | X | X | 14 |
| 2 | X | 5 | X | X | 1 | X | X | X | X | 14 |
| 2 | X | 5 | X | X | 1 | X | X | X | X | 14 |
| 2 | X | 5 | X | X | 1 | X | X | X | X | 14 |

Where the X's in the above matrix are appropriate random values. In this case, the random numbers would be from 1-100. Once an X is chosen, it will be the same X for the entire column (due to the constraints of P). These positions do not matter since they will not be checked for validity. Only the correct challenge positions will be checked. And since all the random matrices are multiplied on the left of P, the columns of P will never be mixed together. IE, the integrity of the columns is intact. In this example, since the challenge was 1, 3, 5, 10, only the $1^{st}$, $3^{rd}$, $5^{th}$, and $10^{th}$ columns of the matrix P would be filled in with correct grid field positions. The other columns are filled in so that the matrix P has the correct geometry. However, the random values also have a veiling effect in that if an attacker listening on the line does not know the challenge, then they have no way of knowing which columns are the correct responses and which are random values.

P2 would be created using the second iterated positions of the digital content. For example, the value for the first column would be 6. So the M's are made up of the grid field position for the digital content for respective challenge responses.

To summarize:
The challenge maps to a grid field
The grid field contains digital content (in this case a number)
That digital content maps to 10 different positions on the grid
This is done for each challenge/response
The first of the 10 positions for each of the response are put into the first matrix
Non challenge positions for the matrix M are filled with appropriate random values A Note on Alternate Method First Steps In some scenarios, depending on the probabilistic front end, the server may need to know how the credential is mapped to the transformation layer. This can be accomplished using the same algorithm on the entire set of session data.

To use an example lets return to the enumerated pattern described in the prior art using FIG. 1 and FIG. 2. Say the server needs to know the content of the first enumerated pattern position, and the correct position of the credential must not be compromised. The server can map all the number 1's to ten positions on the grid, all the 2's to ten positions on the grid, all the 3's to ten positions on the grid, etc. These positions can be processed by either algorithm, simple or complex, as described in the preferred embodiments. Once complete, there will be 10 hashes associated with each number from one to 10. At this point, the primary server can look up the first enumerated pattern position and find out which set it will find its corresponding hash. The match will be in one of ten hashes associated with a number. This number is the content in the field of the first enumerated pattern position. And, while the server knows what number is in the field, it does not know which of the ten positions on the grid the actual first enumerated pattern position is.

This type of processing can be useful in different ways. For instance, when there are two shared secrets that interact with each other. Two examples of this are: the Secret Challenge (RPDPR-SC) algorithm, invented by Mizrah in U.S. Pat. No. 7,849,321 and U.S. Pat. No. 8,955,074.

Network Architecture, Physical Infrastructure, and User Interfaces

Figure 11:
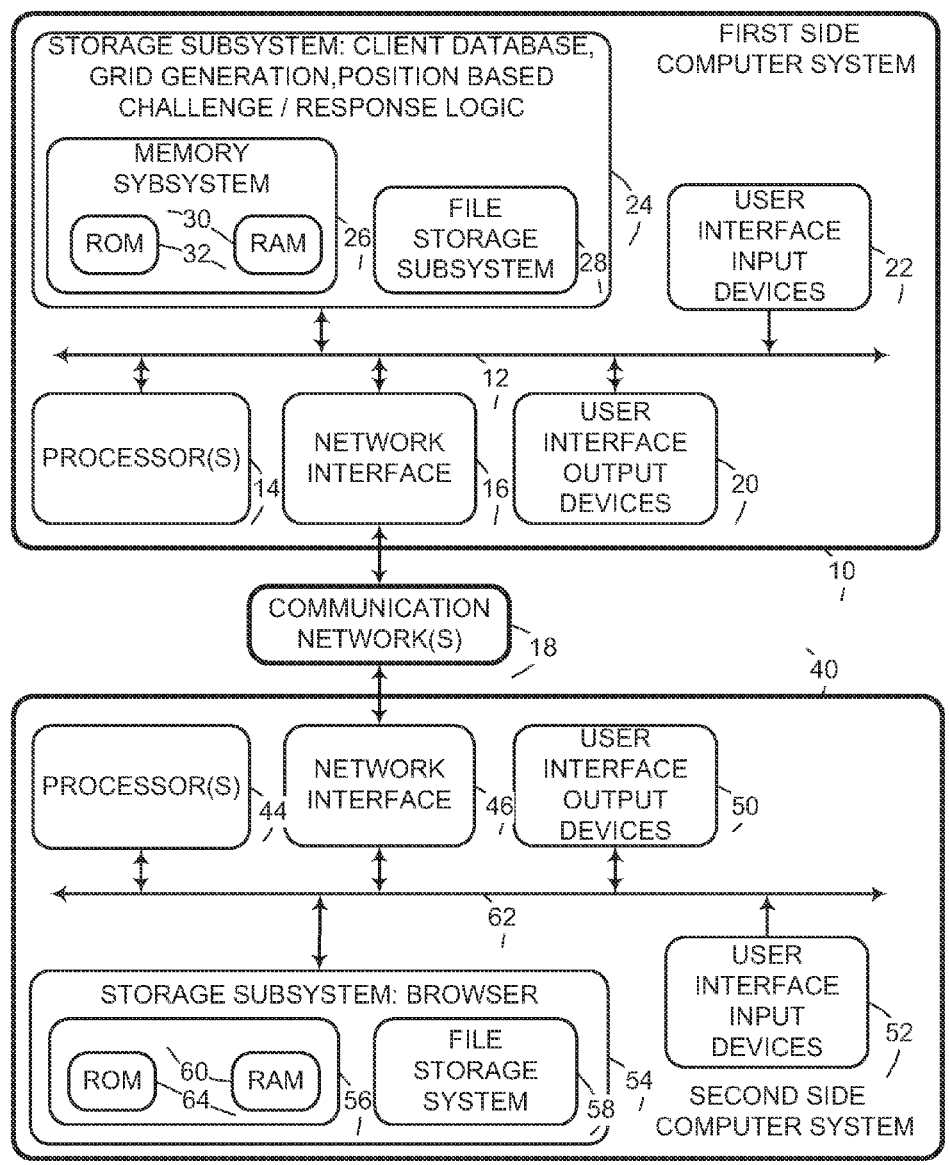
FIG. 11 is a simplified block diagram of a client/server system coupled via a network communication protocol.

FIG. 11 is a simplified block diagram of a first computer system 10 (server side resources) and a second computer system 40 (client side resources) coupled via a communication network 918 or channel, suitable for use in authentication processes described herein. As mentioned above, in some deployments of the present technology, there can be multiple independent computer systems, like system 10, in the server side resources, which provide the primary server, share server and optionally subordinate server roles.

In this example, the first computer system 910 typically includes at least one processor 14 which communicates with a number of peripheral devices via bus subsystem 912. These peripheral devices may include a storage subsystem 24, comprising a memory subsystem 26 and a file storage subsystem 28, user interface input devices 22, user interface output devices 20, and a network interface subsystem 16. The input and output devices allow user interaction with computer system 10. Network interface subsystem 16 provides an interface to outside networks, including an interface to communication network 18, and is coupled via communication network 18 to corresponding interface devices in other computer systems. Communication network 18 may comprise many interconnected computer systems and communication links. These communication links may be wire line links, optical links, wireless links, or any other mechanisms for communication of information. While in one embodiment, communication network 18 is the Internet, in other embodiments, communication network 18 may be any suitable computer network. Likewise, the second computer system 40 typically includes at least one processor 44 which communicates with a number of peripheral devices via bus subsystem 62. These peripheral devices may include a storage subsystem 54, comprising a memory subsystem 56 and a file storage subsystem 58, user interface input devices 52, user interface output devices 50, and a network interface subsystem 46. The input and output devices allow user interaction with second computer system 40. Network interface subsystem 46 provides an interface to outside networks, including an interface to communication network 18, and is coupled via communication network 18. The second computer system 40 may be embodied by smart phones, tablet computers, laptop computers or other systems capable of executing procedures as described herein.

User interface input devices 22, 52 may include a keyboard, pointing devices such as a mouse, trackball, touchpad, or graphics tablet, a scanner, a touch-screen incorporated into the display, audio input devices such as voice recognition systems, microphones, and other types of input devices. In general, use of the term "input device" is intended to include all possible types of devices and ways to input information into computer systems 10, 40 or onto communication network 18.

User interface output devices 20, 50 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image, a video signal or an IPTV stream. The display subsystem may also provide a non-visual display such as via audio output devices. In general, use of the term "output device" is intended to include all possible types of devices and ways to output information from computer systems 10, 40 to the user or to another machine or computer system.

Storage subsystem 24 stores the basic programming and data constructs that provide the functionality of some or all of the processes described herein, including the executable instructions. These software modules are generally executed by processor(s) 14. When the programming and data constructs are combined with other resources in the computer systems 10, 40, the computer systems include logic to perform the functions described herein, on both the server and client sides.

Memory subsystems 26, 54 typically include a number of memories including a main random access memory (RAM) 30, 60 for storage of instructions and data during program execution and a read only memory (ROM) 32, 64 in which fixed instructions are stored. File storage subsystems 28, 58 provide persistent storage for program and data files, and may include a hard disk drive, a floppy disk drive along with associated removable media, a CD-ROM drive, an optical drive, or removable media cartridges. The databases and modules implementing the functionality of certain embodiments may be stored by file storage subsystems 28, 58.

Bus subsystems 12, 62 provide a mechanism for letting the various components and subsystems of computer systems 10, 40 communicate with each other as intended. Although bus subsystems 12, 62 are shown schematically as a single bus, alternative embodiments of the bus subsystem may use multiple busses.

Computer systems 10, 40 can be of varying types including a personal computer, a portable computer, a workstation, a computer terminal, a network computer, a smart phone, a television, a mainframe, or any other data processing system or user device. The computer systems 10, 40 will in many embodiments be different from one another. Due to the ever-changing nature of computers and networks, the description of computer systems 10, 40 depicted in FIG. 11 is intended only as a specific example for purposes of illustrating the preferred embodiments. Many other configurations of computer systems 10, 40 are possible having more or less components than the computer system depicted in FIG. 11.

The first and second computer systems 10 and 40 are configured in this example as a client-server system including authentication resources for the enumerated pattern credential authentication and login functions using two-pattern, position-based authentication technology. The second computer system 40 can be a platform for a client subsystem including data entry devices (keyboard, mouse, voice input, etc.), a display device (CRT, LCD panel, mobile communication device, etc.), and a physical platform (personal computer, hand-held computer, internet appliance, etc.) including a processing unit, memory, and other data processing resources. Software running in the client includes a browser or a "thin" software client such as may be provided on personal digital assistants, mobile phones, and other simple Internet appliances which may not support full browser functionality. The browser can include for example a Java Virtual Machine or a .NET environment which supports the client-server dialogue. Likewise, the "thin" software client may support the client-server dialogue. Finally, an interface to the network communication media is provided. The communication media may be a private or public, local-area network or a wide-area network using wired, wireless or optical media in representative systems.

The first computer system 10 can be a platform for a server subsystem configured such as a server-configured computer, a server farm, a computer and data storage system with database capabilities and other single-site and distributed-site server-side configurations. The platform can include network server resources, an account management utility for the user accounts subject of the authentication process, and a platform including a processing unit, memory, disk space and other data processing resources. A core program supporting the primary server role in the authentication process is included in the server subsystem, which can be used for management of access to a protected network destination which controls access to resources such as secure web sites identified by URLs, links to secure networks, etc. In some embodiments, the core program for the share server role can also be included in the system 10. The core program or programs may be implemented using Java or .NET object-oriented technology for example. Also, a server database (or a directory service, such as LDAP) and database connector can be included. In some embodiments, the server and server data are implemented with security features to protect user account information files from intruders. Also, the computer system 10 may include HSM technologies for the purpose of protection of data between the primary and share server roles. A protected network destination controls access to resources such as secure web sites identified by URLs, links to secure networks, etc.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for knowledge-based probabilistic authentication of a client by server side resources, using a client identifier and a client credential having a number of elements, where each element of the credential represents a character that is mapped to a selected grid location parameter, indicated in a challenge, from a set of N×N grid parameters, the method comprising:

storing data in a computer memory including a first data set for a client identifier including a representation of a client credential accessible by a first server in server side resources, wherein the representation includes at least one of processed credential elements generated from a one-way function of the at least one credential element and protected data, and wherein the protected data cannot be determined by the first server, and a second data set including at least part of said protected data accessible by a second server in the server side resources;

sending from the first server, to authenticate a user, a set of N×N grid parameters (N as a greater than zero integer) of fields filled with random digital content different in each of a plurality of sessions and a challenge of a plurality of session values, and in response from the user, receiving using the first server via data communications, a client identifier and an authentication response corresponding to the challenge that comprises said plurality of session values and each of the plurality of session values can be specified as, at least, a character that is mapped to a selected grid location parameter, indicated in the challenge, from the set of N×N grid parameters;

transforming in the server side resources, said session values of the authentication response into corresponding sets of intermediate values, each set in said sets of intermediate values having a member for the selected grid location parameter to which the corresponding session value of the response can be mapped, and sending said sets of intermediate values to the second server;

generating a plurality of sets of processed credential element match values using the second server, wherein each set of processed credential element match values of the authentication response is derived based upon said one-way function of said protected data and a corresponding one of said sets of intermediate values, and sending said plurality of sets of processed credential element match values to the first server in an order different from an order in which the sets of intermediate values were received using the second server;

determining using the first server, whether each of the sets of processed credential element match values includes one member that matches one of the processed credential elements in the representation of the client credential; and if all of the sets of processed credential element match values for a given authentication response include one member that matches one of the processed credential elements in the representation of the client credential, then signaling authentication success.

2. The method of claim 1, wherein the one-way function includes a hash.

3. The method of claim 1, including generating said representation of the credential in a set up operation, comprising using a client platform:

receiving input data including said client identifier and said credential;

encoding said elements of said credential into corresponding credential values, said credential having a number N elements having credential values;

generating a random value K;

using a one-way function, computing said processed credential elements for said representation of the credential using a combination of the value K and the credential values; and sending said client identifier and said processed credential elements to the first server.

4. The method of claim 3, including encrypting said value K using the client platform using an encryption tunnel between the client platform and the second server to form said protected data, and sending said encrypted protected data to the first server;

assigning an alias for the client identifier using the first server; and sending said encrypted protected data and said alias to the second server.

5. The method of claim 1, wherein said protected data comprises a random value K, and said one-way function uses a combination of the value K and corresponding elements of the credential to produce the processed credential elements.

6. The method of claim 1, wherein said protected data comprises a product KM of a random matrix K and a matrix M having elements that are functions (hashes) of combinations of a first key (mKEY) and said elements of the credential, one-way function uses a combination of a second key (hKEY) and elements of a matrix equal to a product SKM of a random matrix S and said product KM to produce the processed credential elements;

members of said sets of intermediate values being products $KM_P(j)$ of the matrix K and possible value matrices $M_P(j)$, the possible value matrices $M_P(j)$ having elements that are functions of combinations of said first key and the possible parameters (grid locations) in the parameter set to which the corresponding session value of the response can be mapped; and for each of said sets of intermediate values, computing said sets of possible processed credential element match values using the second server, members of said sets of possible processed credential element match values being results of said one-way function using a combination of said second key and elements of the matrices equal to the product $S(KM_P(j))$ of the matrix S and said products $KM_P(j)$.

7. The method of claim 6, wherein the product KM and the second key are produced using a client platform, and protected from determination by the first server by encryption, and including decrypting the product KM and the second key (hKEY) using the second server.

8. The method of claim 1, wherein said protected data comprises a set of values KM generated using an exponentiation function M^K of a generator M and an exponent K, where the generator M is a function of a parameter from the parameter set and a first key, and K is a random value, and said processed credential elements are a function of results SKM of an exponentiation function KM^S, where S is a random value, and said second key.

9. The method of claim 8, wherein the values KM and the second key are produced using a client platform, and protected from determination by the first server by encryption, and including decrypting the values KM and the second key using the second server.

10. The method of claim 1, including generating said representation of the credential in a set up operation, comprising:
   using a client platform;
      receiving input data including said client identifier and said credential;
      encoding said elements of said credential into corresponding credential values, said credential having a number N elements having credential values;
      generating a random value K;
      using a one-way function, computing intermediate values using a combination of the value K and the credential values;
      encrypting said intermediate values using the client platform using an encryption tunnel between the client platforms and the second server to form encrypted protected data;
      sending the protected data the value K and the client identifier to the first server;
   using the first server;
      storing the value K and the client identifier in memory accessible by the first server, assigning an alias to the client identifier, and sending the encrypted protected data and the alias to the second server;
   using the second server:
      decrypting the encrypted protected data to recover said intermediate values, and generating a random value S;
      using a one-way function, computing said processed credential elements using a combination of the value S and the intermediate values; and
      sending said processed credential elements to the first server.

11. The method of claim 1, including generating said representation of the credential in a set up operation, comprising:
   using a client platform:
      receiving input data including said client identifier and said credential;
      encoding said elements of said credential into corresponding credential values, said credential having a number N elements having credential values;
      forming a matrix P having elements that consist of said credential values of said N elements;
      forming a matrix K having random elements;
      generating a first key (mKEY) and a second key (hKEY);
      generating a matrix M having elements determined by a function of the first key and the matrix P;
      generating an intermediate value matrix using a matrix product KM;
      encrypting said intermediate value matrix KM and the second key using the client platform using an encryption tunnel between the client platform and the second server to form encrypted protected data;
      sending the encrypted protected data, the matrix K, the first key and the client identifier to the first server;
   using the first server:
      storing the matrix K, the first key and the client identifier in memory accessible by the first server, assigning an alias to the client identifier, and sending the protected data and the alias to the second server;
   using the second server:
      decrypting the encrypted protected data to recover said intermediate value matrix KM and the second key, storing the second key and the alias in memory accessible to the second server, and generating matrix S having random elements;
      generating a matrix using a matrix product S(KM);
      using a one-way function, computing said processed credential elements using a combination of the elements of the matrix product S(KM) and the second key; and
      sending said processed credential elements to the first server.

12. The method of claim 1, including generating said representation of the credential in a set up operation, comprising
   using a client platform:
      receiving input data including said client identifier and said credential;
      encoding said elements of said credential into corresponding credential values, said credential having a number N elements having credential values;
      generating a random value K;
      randomly generating a first key (mKEY) and a second key (hKEY);
      generating generators M corresponding to each part of said credential, the generators being a determined by a function of the first key and the credential values of the elements of said credential;
      calculating intermediate values KM using a exponentiation function M^K for each generator M;
      encrypting said intermediate values KM and the second key using the client platform and an encryption tunnel between the client platform and the second server to form said protected data;
      sending the encrypted protected data, the random value K, the first key and the client identifier to the first server;
   using the first server:
      storing the random value K, the first key and the client identifier in memory accessible by the first server, assigning an alias to the client identifier, and sending the encrypted protected data and the alias to the second server;
   using the second server:
      decrypting the encrypted protected data to recover said intermediate values KM and the second key, storing the second key and the alias in memory accessible to the second server, and generating a random value S;
      calculating values SKM using an exponentiation function KM^S for each said intermediate values KM;
      computing said processed credential elements using a function (e.g. a hash) of a combination the values SKM and the second key; and
      sending said processed credential elements to the first server.

13. The method of claim 1, including presenting a session specific instance of an interface usable to produce said authentication response using a client platform, said session specific instance comprising an interface mapping construct in which any given session value of the authentication response maps to a plurality of features on the interface that correspond to possible parameters in the parameter set.

14. The method of claim 1, wherein said using the second server includes using one or more subordinated server.

15. The method of claim 1, wherein said using the first server includes using one or more subordinated server.

16. The method of claim 1, wherein said protected data includes a source of randomness.

17. A client-server authentication system for knowledge-based probabilistic authentication of a client by server side resources, using a client identifier and a client credential having a number of elements, where each element of the credential represents a character that is mapped to a selected grid location parameter, indicated in a challenge, from a set of N×N grid parameters, comprising:
    server-side data processing resources, including one or more processors, memory and a communication interface, the server-side data processing resources including at least first and second servers;
    data stored in said memory including a first data set for a client identifier including a representation of the client credential accessible by a first server in server side resources, wherein the representation includes at least one of processed credential elements generated from a one-way function of the at least one credential element and protected data, and wherein the protected data cannot be determined by the first server, and a second data set including at least part of said protected data accessible by a second server in the server side resources;
    the data processing resources including executable instructions stored in said memory adapted for execution by the processor, including logic to
    receive using the first server via data communications, a client identifier and an authentication response corresponding to the challenge that comprises said plurality of session values and each of the plurality of session values can be specified as, at least, a character that is mapped to a selected grid location parameter, indicated in the challenge, from the set of N×N grid parameters (N as a greater than zero integer) of fields filled with random digital content different in each of a plurality of sessions sent by the server;
    transform in the server side resources, said session values of the authentication response into corresponding sets of intermediate values, each set in said sets of intermediate values having a member for the selected grid location parameter to which the corresponding session value of the response can be mapped, and sending said sets of intermediate values to the second server;
    generate a plurality of sets of processed credential element match values using the second server, wherein each set of processed credential element match values of the authentication response is derived based upon said one-way function of said protected data and a corresponding one of said sets of intermediate values, and send said plurality of sets of processed credential element match values to the first server in an order different from an order in which the sets of intermediate values were received using the second server;
    determine using the first server, whether each of the sets of processed credential element match values includes one member that matches one of the processed credential elements in the representation of the client credential; and
    if all of the sets of processed credential element match values for a given authentication response include one member that matches one of the processed credential elements in the representation of the client credential, then signaling authentication success.

18. The authentication system of claim 17, wherein the one-way function includes a hash.

19. The authentication system of claim 17, said executable instructions including logic to receive from a client platform input data including said client identifier and said processed credential elements using the first server.

20. The authentication system of claim 19, said executable instructions including logic to receive encrypted protected data from a client platform using the first server;
    assign an alias for the client identifier using the first server; and
    send said encrypted protected data and said alias to the second server.

21. The authentication system of claim 17, wherein said protected data comprises a random value K, and said one-way function uses a combination of the value K and corresponding elements of the credential to produce the processed credential elements.

22. The authentication system of claim 17, wherein said protected data comprises a product KM of a random matrix K and a matrix M having elements that are functions (hashes) of combinations of a first key (mKEY) and said elements of the credential, one-way function uses a combination of a second key (hKEY) and elements of a matrix equal to a product SKM of a random matrix S and said product KM to produce the processed credential elements;
    members of said sets of intermediate values being products of the matrix K and possible value matrices, the possible value matrices having elements that are functions of combinations of said first key and the possible parameters (grid locations) in the parameter set to which the corresponding session value of the response can be mapped; and
    said, executable instructions including logic to compute for each of said sets of intermediate values, said sets of possible processed credential element match values using the second server, members of said sets of possible processed credential element match values being results of said one-way function using a combination of said second key.

23. The authentication system of claim 22, wherein the product KM and the second key are receive from a client platform, and protected from determination by the first server by encryption, and said executable instructions including logic to decrypt the product KM and the second key (hKEY) using the second server.

24. The authentication system of claim 17, wherein said protected data comprises a set of values KM generated using an exponentiation function M^K of a generator M and an exponent K, where the generator M is a function of a parameter from the parameter set and a first key, and K is a random value, and said processed credential elements are a function of results SKM of an exponentiation function KM^S, where S is a random value, and said second key.

25. The authentication system of claim 24, wherein the values KM and the second key are produced using a client platform, and protected from determination by the first server by encryption, and said executable instructions including logic to decrypt the values KM and the second key using the second server.

26. The authentication system of claim 17, said executable instructions including logic to
    receive data from a client platform using the first server including encrypted protected data, a random value K and the client identifier, the encrypted protected data including intermediate data which are results of a one-way function using a combination of the value K and the credential values;

store the value K and the client identifier in memory accessible by the first server, assigning an alias to the client identifier, and send the encrypted protected data and the alias to the second server;

using the second server, decrypt the encrypted protected data to recover said intermediate values, and generate a random value S;

use a one-way function, computing using the second server, said processed credential elements using a combination of the value S and the intermediate values; and send said processed credential elements from the second server to the first server.

27. The authentication system of claim 17, said executable instructions including logic to receive data from a client platform using the first server including the encrypted protected data, a random matrix K, a first key and a client identifier, the encrypted protected data including a second key and an intermediate value matrix KM which are results of a product of the random matrix K and a matrix M having elements determined by a function of the first key and a matrix P, the matrix P having elements that consist of said credential values;

store the matrix K, the first key and the client identifier in memory accessible by the first server, assigning an alias to the client identifier, and send the encrypted protected data and the alias to the second server;

decrypt the encrypted protected data using the second server to recover said intermediate value matrix and the second key, store the second key and the alias in memory accessible to the second server, and generate matrix S having random elements;

generate using the second server a matrix using a matrix product S(KM);

use a one-way function using the second server to compute said processed credential elements using a combination of the elements of the matrix product S(KM) and the second key; and send said processed credential elements to the first server.

28. The authentication system of claim 17, said executable instructions including logic to receive data from a client platform using the first server including the encrypted protected data, a random value K, a first key and the client identifier to the first server; the encrypted protected data including a second key and intermediate values which are results of an exponentiation function M^K for each generator M, including a generator M for each part of said credential, the generators being a determined by a function of the first key and the credential values of the elements of said credential;

store the random value K, the first key and the client identifier in memory accessible by the first server, assign an alias to the client identifier, and send the encrypted protected data and the alias to the second server;

decrypt the encrypted protected data to recover said intermediate values KM and the second key, store the second key and the alias in memory accessible to the second server, and generate a random value S;

calculate values SKM using an exponentiation function KM^S for each said intermediate values KM;

compute said processed credential elements using a function (e.g. a hash) of a combination the values SKM and the second key; and send said processed credential elements to the first server.

29. The authentication system of claim 17, said executable instructions including logic to present a session specific instance of an interface usable to produce said authentication response to a client platform, said session specific instance comprising an interface mapping construct in which any given session value of the authentication response maps to a plurality of features on the interface that correspond to possible parameters in the parameter set.

30. The authentication system of claim 17, wherein the second server includes one or more subordinated server.

31. The authentication system of claim 17, wherein the first server includes one or more subordinated server.

32. The authentication system of claim 17, wherein said protected data includes a source of randomness.

33. A computer program stored on a non-transitory computer readable medium to authenticate a client, comprising instructions when executable by a computer processor to:

store data in a computer memory including a first data set for a client identifier including a representation of client credential accessible by a first server in server side resources, wherein the representation including at least one of processed credential elements generated from a one-way function of the at least one credential element and protected data, and wherein the protected data cannot be determined by the first server, and a second data set including at least part of said protected data accessible by a second server in the server side resources;

send from the first server, to authenticate a user, a set of N×N grid parameters (N as a greater than zero integer) of fields filled with random digital content different in each of a plurality of sessions and a challenge of a plurality of session values, and in response from the user, receive using the first server via data communications, a client identifier and an authentication response corresponding to the challenge that comprises said plurality of session values and each of the plurality of session values can be specified as, at least, a character that is mapped to a selected grid location parameter, indicated in the challenge, from the set of N×N grid parameters transform in the server side resources, said session values of the authentication response into corresponding sets of intermediate values, each set in said sets of intermediate values having a member for the selected grid location parameter to which the corresponding session value of the response can be mapped, and sending said sets of intermediate values to the second server;

generate a plurality of sets of processed credential element match values using the second server, wherein each set of processed credential element match values of the authentication response is derived based upon said one-way function of said protected data and a corresponding one of said sets of intermediate values, and send said plurality of sets of processed credential element match values to the first server in an order different from an order in which the sets of intermediate values were received using the second server;

determine using the first server, whether each of the sets of processed credential element match values includes one member that matches one of the processed credential elements in the representation of the client credential; and if all of the sets of processed credential element match values for a given authentication response include one member that matches one of the processed credential elements in the representation of the client credential, then signaling authentication success.

34. The computer program of claim 33, wherein the one-way function includes a hash.

35. The computer program of claim 33, said instructions including logic to receive from a client platform input data including said client identifier and said processed credential elements using the first server.

36. The computer program of claim 35, said instructions including logic to receive encrypted protected data from a client platform using the first server;
  assign an alias for the client identifier using the first server; and
  send said encrypted protected data and said alias to the second server.

37. The computer program of claim 33, wherein said protected data comprises a random value K, and said one-way function uses a combination of the value K and corresponding elements of the credential to produce the processed credential elements.

38. The computer program of claim 33, wherein said protected data comprises a product KM of a random matrix K and a matrix M having elements that are functions (hashes) of combinations of a first key (mKEY) and said elements of the credential, one-way function uses a combination of a second key (hKEY) and elements of a matrix equal to a product SKM of a random matrix S and said product KM to produce the processed credential elements;
  members of said sets of intermediate values being products of the matrix K and possible value matrices, the possible value matrices having elements that are functions of combinations of said first key and the possible parameters (grid locations) in the parameter set to which the corresponding session value of the response can be mapped; and
  said instructions including logic to compute for each of said sets of intermediate values, said sets of possible processed credential element match values using the second server, members of said sets of possible processed credential element match values being results of said one-way function using a combination of said second key.

39. The computer program of claim 38, wherein the product KM and the second key are receive from a client platform, and protected from determination by the first server by encryption, and said instructions including logic to decrypt the product KM and the second key (hKEY) using the second server.

40. The computer program of claim 33, wherein said protected data comprises a set of values KM generated using an exponentiation function M^K of a generator M and an exponent K, where the generator M is a function of a parameter from the parameter set and a first key, and K is a random value, and said processed credential elements are a function of results SKM of an exponentiation function KM^S, where S is a random value, and said second key.

41. The computer program of claim 40, wherein the values KM and the second key are produced using a client platform, and protected from determination by the first server by encryption, and said instructions including logic to decrypt the values KM and the second key using the second server.

42. The computer program of claim 33, said instructions including logic to
  receive data from a client platform using the first server including encrypted protected data, a random value K and the client identifier, the encrypted protected data including intermediate data which are results of a one-way function using a combination of the value K and the credential values;
  store the value K and the client identifier in memory accessible by the first server, assigning an alias to the client identifier, and send the encrypted protected data and the alias to the second server;
  using the second server, decrypt the encrypted protected data to recover said intermediate values, and generate a random value S;
  use a one-way function, computing using the second server, said processed credential elements using a combination of the value S and the intermediate values; and
  send said processed credential elements from the second server to the first server.

43. The computer program of claim 33, said instructions including logic to
  receive data from a client platform using the first server including the encrypted protected data, a random matrix K, a first key and a client identifier, the encrypted protected data including a second key and an intermediate value matrix KM which are results of a product of the random matrix K and a matrix M having elements determined by a function of the first key and a matrix P, the matrix P having elements that consist of said credential values;
  store the matrix K, the first key and the client identifier in memory accessible by the first server; assigning an alias to the client identifier, and send the encrypted protected data and the alias to the second server;
  decrypt the encrypted protected data using the second server to recover said intermediate value matrix and the second key, store the second key and the alias in memory accessible to the second server, and generate matrix S having random elements;
  generate using the second server a matrix using a matrix product S(KM);
  use a one-way function using the second server to compute said processed credential elements using a combination of the elements of the matrix product S(KM) and the second key; and
  send said processed credential elements to the first server.

44. The computer program of claim 33, said instructions including logic to
  receive data from a client platform using the first server including the encrypted protected data, a random value K, a first key and the client identifier to the first server; the encrypted protected data including a second key and intermediate values which are results of an exponentiation function M^K for each generator M, including a generator M for each part of said credential, the generators being a determined by a function of the first key and the credential values of the elements of said credential;
  store the random value K, the first key and the client identifier in memory accessible by the first server, assign au alias to the client identifier, and send the encrypted protected data and the alias to the second server;
  decrypt the encrypted protected data to recover said intermediate values KIM and the second key, store the second key and the alias in memory accessible to the second server, and generate a random value S;
  calculate values SKM using an exponentiation function KM^S for each said intermediate values KM;
  compute said processed credential elements using a function (e.g. a hash) of a combination the values SKM and the second key; and
  send said processed credential elements to the first server.

45. The computer program of claim 33, said instructions including logic to present a session specific instance of an interface usable to produce said authentication response to a client platform, said session specific instance comprising an interface mapping construct in which any given session value of the authentication response maps to a plurality of features on the interface that correspond to possible parameters in the parameter set.

46. The computer program of claim 33, wherein the second server includes one or more subordinated server.

47. The computer program of claim 33, wherein the first server includes one or more subordinated server.

48. The computer program of claim 33, wherein said protected data includes a source of randomness.

49. A server in client-server authentication system for knowledge-based probabilistic authentication of a client by server side resources, using a client identifier and a credential having a number of elements, where each element of the client credential represents a character that is mapped to a selected grid location parameter, indicated in a challenge, from a set of N×N grid, comprising:
   data processing resources, including one or more processors, memory and a communication interface;
   data stored in said memory including a first data set for a client identifier including a representation of the client credential accessible by a first server in server side resources, wherein the representation includes at least one of processed credential elements generated from a one-way function of the at least one credential element and protected data, and wherein the protected data cannot be determined by the first server, and a second data set including at least part of said protected data accessible by a second server in the server side resources;
   the data processing resources including executable instructions stored in said memory adapted for execution by the processor, including logic to
   receive using the first server via data communications, a client identifier and an authentication response corresponding to the challenge that comprises said plurality of session values and each of the plurality of session values can be specified as, at least, a character that is mapped to a selected grid location parameter, indicated in the challenge, from the set of N×N grid parameters (N as a greater than zero integer) of fields filled with random digital content different in each of a plurality of sessions sent by the server;
   transform in the server side resources, said session values of the authentication response into corresponding sets of intermediate values, each set in said sets of intermediate values having a member for the selected grid location parameter to which the corresponding session value of the response can be mapped, and sending said sets of intermediate values to a second server;
   receive a plurality of sets of processed credential element match values from the second server, wherein each set of processed credential element match values of the authentication response is derived based upon said one-way function of said protected data and a corresponding one of said sets of intermediate values, said plurality of sets of processed credential element match values to the first server in an order different from an order in which the sets of intermediate values were sent to the second server;
   determine using the first server, whether each of the sets of processed credential element match values includes one member that matches one of the processed credential elements in the representation of the client credential; and
   if all of the sets of processed credential element match values for a given authentication response include one member that matches one of the processed credential elements in the representation of the client credential, then signaling authentication success.

* * * * *